United States Patent
Rath et al.

(10) Patent No.: US 11,558,604 B2
(45) Date of Patent: Jan. 17, 2023

(54) METHOD AND APPARATUS FOR INTRA PREDICTION USING A COMPOSITE REFERENCE ARRAY

(71) Applicant: InterDigital VC Holdings, Inc., Wilmington, DE (US)

(72) Inventors: Gagan Bihari Rath, Cesson-Sevigne (FR); Tangi Poirier, Cesson-Sevigne (FR); Fabrice Urban, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/979,830

(22) PCT Filed: Apr. 8, 2019

(86) PCT No.: PCT/US2019/026310
§ 371 (c)(1),
(2) Date: Sep. 10, 2020

(87) PCT Pub. No.: WO2019/199664
PCT Pub. Date: Oct. 17, 2019

(65) Prior Publication Data
US 2021/0377516 A1    Dec. 2, 2021

(30) Foreign Application Priority Data

Apr. 12, 2018   (EP) ..................... 18305445

(51) Int. Cl.
*H04N 19/105*   (2014.01)
*H04N 19/117*   (2014.01)
(Continued)

(52) U.S. Cl.
CPC ......... *H04N 19/105* (2014.11); *H04N 19/117* (2014.11); *H04N 19/132* (2014.11);
(Continued)

(58) Field of Classification Search
CPC .. H04N 19/105; H04N 19/117; H04N 19/132; H04N 19/159; H04N 19/176; H04N 19/82
See application file for complete search history.

(56) References Cited

U.S. PATENT DOCUMENTS

2004/0136458 A1   7/2004   Dahlhoff et al.
2013/0101036 A1   4/2013   Zhou et al.
(Continued)

FOREIGN PATENT DOCUMENTS

EP   2081386 A1   7/2009

OTHER PUBLICATIONS

Li et al., "Multiple line-based intra predication", Document: JVET-C0071, pp. 1-6, Joint Video Exploration Team (JVET) of ITU-T SG 16 WP 3 and ISO/ JTC 1/SC 29/WG 11, 3rd Meeting: Geneva, CH, May 26-Jun. 1, 2016.
(Continued)

*Primary Examiner* — Md N Haque
(74) *Attorney, Agent, or Firm* — Xiaoan Lu

(57) ABSTRACT

Methods and apparatus for intra prediction in video encoding and decoding using a composite reference array are described. In one exemplary embodiment, the composite reference array is formed from two or more reference arrays of a plurality of reference arrays. The composite reference array can be formed by projecting along a prediction direction, one or more of the plurality of reference arrays onto a reference array closest to the block of the video data being encoded or decoded. The filter coefficients for the interpolation filter are then determined based on the locations of the predictors on different reference arrays. Interpolating reference samples from different reference arrays, the predictor value for a target sample can be obtained.

22 Claims, 14 Drawing Sheets

(51) Int. Cl.
H04N 19/132 (2014.01)
H04N 19/159 (2014.01)
H04N 19/176 (2014.01)
H04N 19/82 (2014.01)

(52) U.S. Cl.
CPC ......... *H04N 19/159* (2014.11); *H04N 19/176* (2014.11); *H04N 19/82* (2014.11)

(56) References Cited

U.S. PATENT DOCUMENTS

| | | | | |
|---|---|---|---|---|
| 2014/0198855 A1* | 7/2014 | Sole Rojals | ......... | H04N 19/593 375/240.16 |
| 2015/0016516 A1* | 1/2015 | Saxena | ................ | H04N 19/182 375/240.12 |
| 2016/0080745 A1* | 3/2016 | Kwak | .................... | H04N 19/82 375/240.12 |
| 2016/0373782 A1* | 12/2016 | Zhao | .................... | H04N 19/463 |
| 2017/0094285 A1* | 3/2017 | Said | ..................... | H04N 19/147 |
| 2017/0347093 A1* | 11/2017 | Yu | .......................... | H04N 19/42 |

OTHER PUBLICATIONS

Matsuda et al., "Interpolative Intra Prediction by Adapting Processing Orderin Block-Based Image Coding", 2013 IEEE International Conference on Image Processing, Sep. 15-18, 2013, pp. 1646-1650, Melbourne, VIC, Australia, 2013.

Chen et al.,"Description of SDR, HDR and 360 video coding by Qualcomm and Technicolor-low and high complexity versions", Document: JVET-J0021, pp. 1-43, Joint Video Exploration Team (JVET) of ITU-T SG 16 WP 3 and ISO/IEC JTC 1/SC 29/WG 11, 10th Meeting: San Diego, US, Apr. 10-20, 2018.

Minezawa et al., "Block Boundary Filtering for Intra Prediction Samples", 2013 IEEE International Conference on Consumer Electronics (ICCE), pp. 1-4, 2013.

Chang, et al., "Arbitrary reference tier for intra directional modes", Joint Video Exploration Team (JVET 3rd meeting, JVET) of ITU-T SG 16 WP 3 and ISO/IEC JTC 1/SC 29/WG 11, 3rd Meeting: Geneva, CH, May 26-Jun. 1, 2016.

Matsuo et al., "Intra Prediction With Spatial Gradients and Multiple Reference Lines", 2009 Picture Coding Symposium, May 6-8, 2009, Chicago, IL, USA, pp. 1-4, 2009.

Kang et al., "Description of SDR video coding technology proposal by ETRI and Sejong University", Document: JVET-J0013-v2, Joint Video Experts Team (JVET) of ITU-T SG 16 WP 3 and ISO/IEC JTC 1/SC 29/WG 11, 10th Meeting: San Diego, US, Apr. 10-20, 2018.

Chen et al., "Further improvements to HMKTA-1.0", Document: VCEG-AZ07_v2, pp. 1-8, ITU—Telecommunications Standardization Sector, Study Group 16, Question 6, Video Coding Experts Group (VCEG), 52nd Meeting: 19-26, Warsaw, Poland, Jun. 2015.

Chang et al., "EE6: Arbitrary Reference Tier for Intra Directional Modes, with Supplementary Results", Document: JVET-D0099r2, pp. 1-6, Joint Video Exploration Team (JVET), of ITU-T SG 16 WP 3 and ISO/IEC JTC 1/SC 29/WG 11, 4th Meeting: Chengdu, CN, Oct. 15-21, 2016.

* cited by examiner

METHOD AND APPARATUS FOR INTRA PREDICTION USING A COMPOSITE REFERENCE ARRAY

This application claims the benefit, under 35 U.S.C. § 371 of International Application No. PCT/US2019/026310, filed Apr. 8, 2019, which was published on Oct. 17, 2019, which claims the benefit of European Patent Application No. EP18305445.1 filed Apr. 12, 2018.

TECHNICAL FIELD

At least one of the present embodiments generally relates to a method or an apparatus for video encoding and decoding, and more particularly, to a method or an apparatus for performing intra prediction or using a composite reference array formed from two or more different reference arrays. The different reference arrays may comprise different rows, columns and/or layers of video samples.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors or prediction residuals, are transformed, quantized and entropy coded. To reconstruct the video, the compressed data are decoded by inverse processes corresponding to the prediction, transform, quantization and entropy coding.

Intra prediction in video compression refers to the spatial prediction of a block of pixels using information from causal neighbor blocks, that is, neighboring blocks in the same frame which have already been encoded or decoded. Intra prediction is a powerful coding tool since it allows for high compression efficiency in intra frames, as well as in inter frames. Therefore, intra prediction has been included as a core coding tool in many video compression standards including, but not limited to, H.264/AVC (Advanced Video Coding), H.265/HEVC (High Efficiency Video Coding), and H.266 being developed by the WET (Joint Video Exploration Team).

SUMMARY

According to a general aspect of at least one embodiment, a method for encoding video data is presented, comprising: forming a plurality of reference arrays for a block of the video data from reconstructed samples of the video data; forming a composite reference array from two or more of the plurality of reference arrays by projecting along a prediction direction one or more of the plurality of reference arrays onto a reference array closest to the block of the video data; computing a predictor for a target pixel of the block of the video data from the composite reference array; and encoding the block of the video data using the predictor.

According to another general aspect of at least one embodiment, a method for decoding video data is presented, comprising: forming a plurality of reference arrays for a block of the video data from decoded samples of the video data; forming a composite reference array from two or more of the plurality of reference arrays by projecting along a prediction direction one or more of the plurality of reference arrays onto a reference array closest to the block of the video data; computing a predictor for a target pixel of the block of the video data from the composite reference array; and decoding the block of the video data using the predictor.

According to another general aspect of at least one embodiment, an apparatus for encoding video data is presented, comprising at least a memory and one or more processors, wherein the one or more processors are configured to: form a plurality of reference arrays for a block of the video data from reconstructed samples of the video data; form a composite reference array from two or more of the plurality of reference arrays by projecting along a prediction direction one or more of the plurality of reference arrays onto a reference array closest to the block of the video data; compute a predictor for a target pixel of the block of the video data from the composite reference array; and encode the block of the video data using the predictor.

According to another general aspect of at least one embodiment, an apparatus for encoding video data is presented, comprising: means for forming a plurality of reference arrays for a block of the video data from reconstructed samples of the video data; means for forming a composite reference array from two or more of the plurality of reference arrays by projecting along a prediction direction one or more of the plurality of reference arrays onto a reference array closest to the block of the video data; means for computing a predictor for a target pixel of the block of the video data from the composite reference array; and means for encoding the block of the video data using the predictor.

According to another general aspect of at least one embodiment, an apparatus for decoding video data, comprising at least a memory and one or more processors, wherein the one or more processors are configured to: form a plurality of reference arrays for a block of the video data from decoded samples of the video data; form a composite reference array from two or more of the plurality of reference arrays by projecting along a prediction direction one or more of the plurality of reference arrays onto a reference array closest to the block of the video data; compute a predictor for a target pixel of the block of the video data from the composite reference array; and decode the block of the video data using the predictor.

According to another general aspect of at least one embodiment, an apparatus for decoding video data, comprising: means for forming a plurality of reference arrays for a block of the video data from decoded samples of the video data; means for forming a composite reference array from two or more of the plurality of reference arrays by projecting along a prediction direction one or more of the plurality of reference arrays onto a reference array closest to the block of the video data; computing a predictor for a target pixel of the block of the video data from the composite reference array; and decoding the block of the video data using the predictor.

According to an embodiment, a reference array comprises a row of pixels above, and a column of pixels to the left of, the block of the video data.

According to another embodiment, the predictor is computed using a Gaussian filter.

According to another embodiment, the Gaussian filter is a 4-tap Gaussian filter.

According to another embodiment, a filter is applied to interpolate the predictor using four integral samples of the composite reference array nearest to the predictor.

According to another embodiment, coefficients for the interpolation filter are determined based on predictor positions on the two or more of the plurality of reference arrays.

According to another embodiment, the block of the video data is intra predicted.

According to another embodiment, the prediction direction corresponds to an angular prediction mode.

According to another embodiment, the composite reference array is formed only if the predictor does not coincide with a sample on the reference array closest to the block of the video data.

According to another general aspect of at least one embodiment, a bitstream is formatted to include an encoded block of video data, wherein the encoded block of video data is encoded by: forming a plurality of reference arrays for the block of the video data from reconstructed samples of the video data; forming a composite reference array from two or more of the plurality of reference arrays by projecting along a prediction direction one or more of the plurality of reference arrays onto a reference array closest to the block of the video data; computing a predictor for a target pixel of the block of the video data from the composite reference array; and encoding the block of the video data using the predictor.

One or more of the present embodiments also provide a computer readable storage medium having stored thereon instructions for encoding or decoding video data according to the methods described above. The present embodiments also provide a computer readable storage medium having stored thereon a bitstream generated according to the methods described above. The present embodiments also provide methods and apparatuses for transmitting or receiving the bitstream generated according to the methods described above.

DETAILED DESCRIPTION

Figure 1:
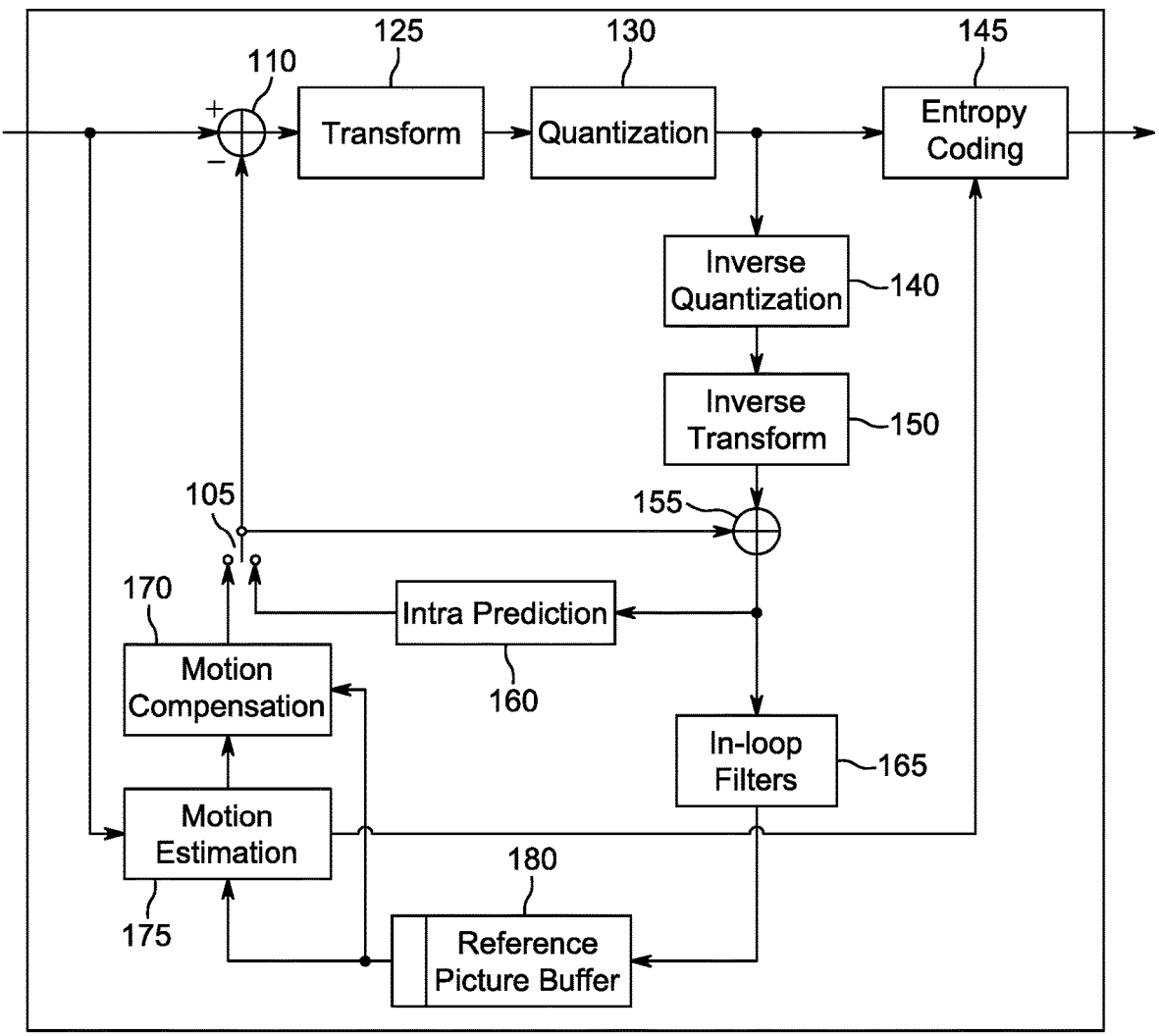
FIG. 1 illustrates a block diagram of an exemplary video encoder.

FIG. 1 illustrates an exemplary video encoder 100, such as an HEVC encoder. HEVC is a compression standard developed by Joint Collaborative Team on Video Coding (JCT-VC) (see, e.g., "ITU-T H.265 TELECOMMUNICATION STANDARDIZATION SECTOR OF ITU (10/2014), SERIES H: AUDIOVISUAL AND MULTIMEDIA SYSTEMS, Infrastructure of audiovisual services—Coding of moving video, High efficiency video coding, Recommendation ITU-T H.265"). FIG. 1 may also illustrate an encoder in which improvements are made to the HEVC standard or an encoder employing technologies similar to HEVC, such as an encoder based on or improved upon JEM (Joint Exploration Model) under development by JVET.

In the present application, the terms "reconstructed" and "decoded" may be used interchangeably, the terms "pixel" and "sample" may be used interchangeably, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In the exemplary encoder 100 in FIG. 1, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 3:
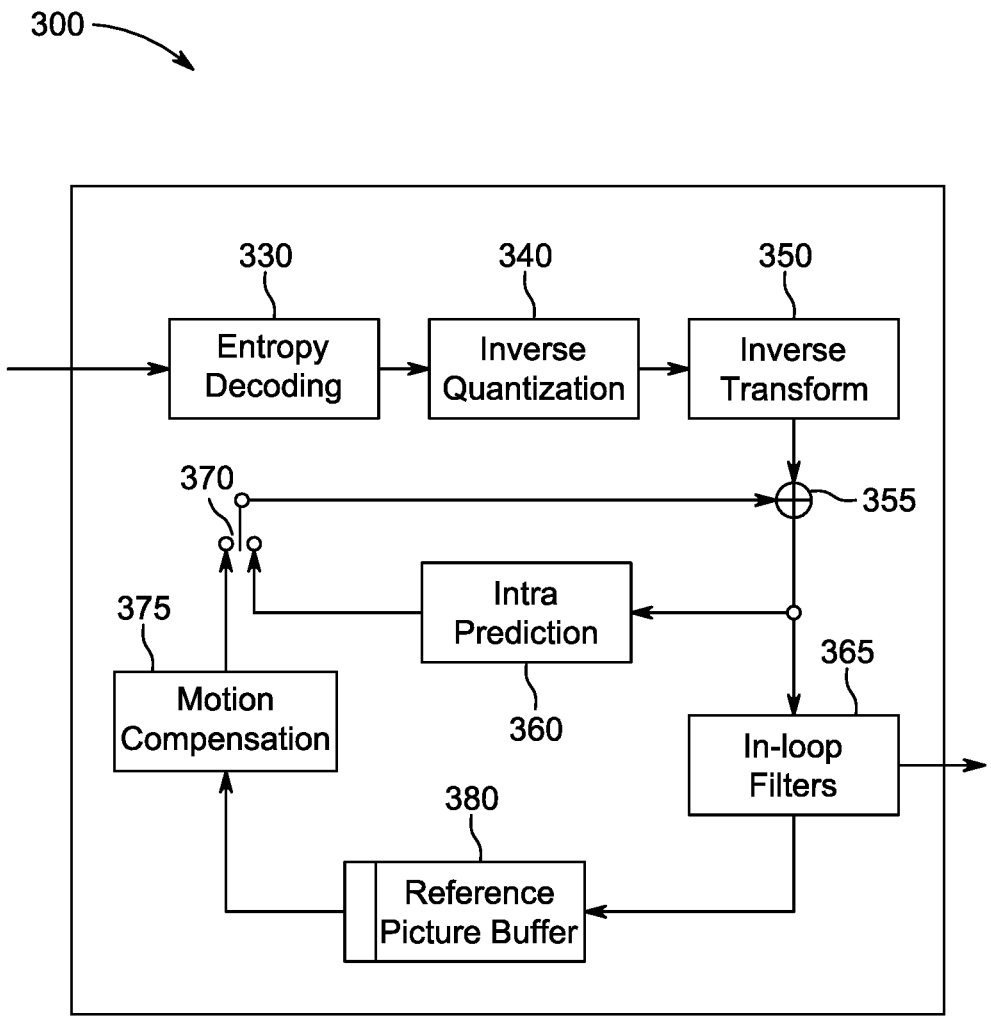
FIG. 3 illustrates a block diagram of an exemplary video decoder.

FIG. 3 illustrates a block diagram of an exemplary video decoder 300, such as an HEVC decoder. In the exemplary decoder 300, a bitstream is decoded by the decoder elements as described below. Video decoder 300 generally performs a decoding pass reciprocal to the encoding pass as described in FIG. 1, which performs video decoding as part of encoding video data. FIG. 3 may also illustrate a decoder in which improvements are made to the HEVC standard or a decoder employing technologies similar to HEVC, such as a decoder based on or improved upon JEM.

In particular, the input of the decoder includes a video bitstream, which may be generated by video encoder 100. The bitstream is first entropy decoded (330) to obtain transform coefficients, motion vectors, and other coded information. The transform coefficients are de-quantized (340) and inverse transformed (350) to decode the prediction residuals. Combining (355) the decoded prediction residuals and the predicted block, an image block is reconstructed. The predicted block may be obtained (370) from intra prediction (360) or motion-compensated prediction (i.e., inter prediction) (375). Advanced Motion Vector Prediction (AMVP) and merge mode techniques may be used to derive motion vectors for motion compensation, which may use interpolation filters to calculate interpolated values for sub-integer samples of a reference block. In-loop filters (365) are applied to the reconstructed image. The filtered image is stored at a reference picture buffer (380).

In order to exploit the spatial redundancy, CUs in intra mode are predicted from reconstructed neighboring samples within the same slice. The causal neighboring CUs have already been encoded/decoded when the encoding/decoding of the current CU is considered. To avoid mismatch, the encoder and the decoder have the same prediction. Therefore, both the encoder and the decoder use the information from the reconstructed/decoded neighboring causal CUs to form prediction for the current CU.

Figure 2A:
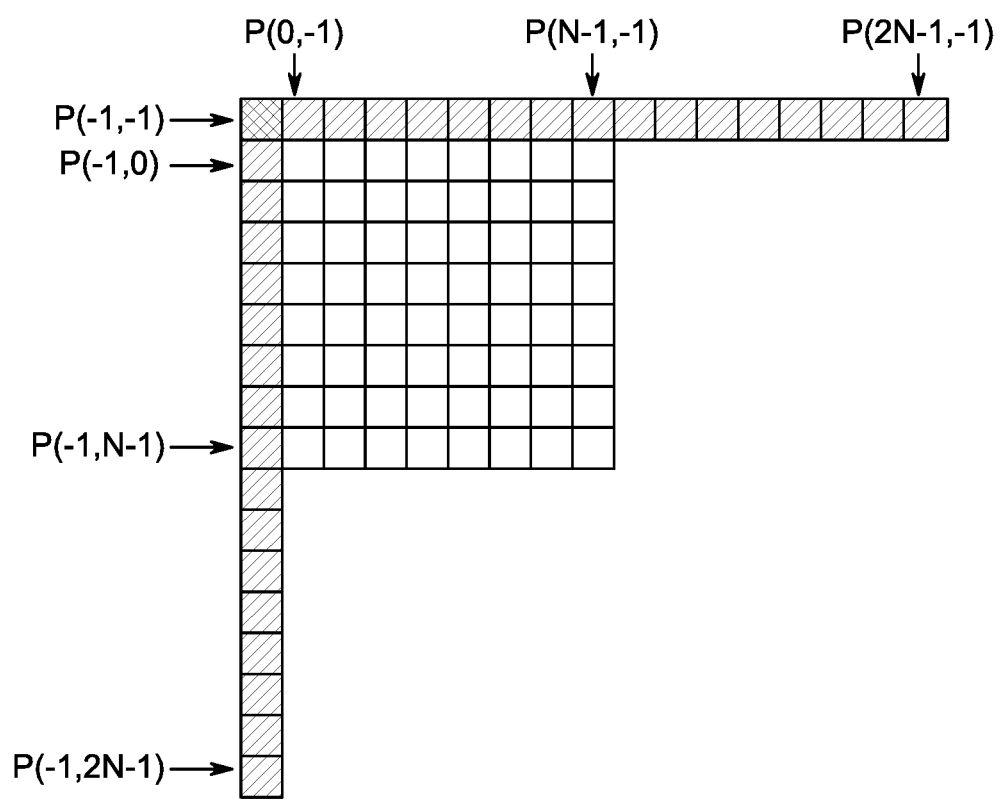
FIG. 2A is a pictorial example depicting the reference samples for intra prediction in HEVC.

The intra prediction process in HEVC includes three steps: (1) reference sample generation, (2) intra sample prediction, and (3) post-processing of predicted samples. Exemplary HEVC reference samples for intra prediction are illustrated in FIG. 2A, where the reference sample candidates are the row on the top (shaded) and the column on the left (also shaded) of a target block (unshaded). The pixel values at coordinate (x, y) are indicated in FIG. 2A by P(x, y). For a CU of size N×N, a row of 2N decoded samples on the top is formed from the decoded CUs. Similarly, a column of 2N samples on the left is formed from the decoded CUs. The corner pixel from the above-left decoded CU is used to fill up the gap between the above row and the left column references. If some of the samples are not available, for example, when the corresponding CUs are not in the same slice or the current CU is at a frame boundary, then reference sample substitution is performed where the missing samples are copied from the available samples in a clock-wise direction. Then, depending on the current CU size and the prediction mode, the reference samples are filtered using a specified filter.

Figure 2B:
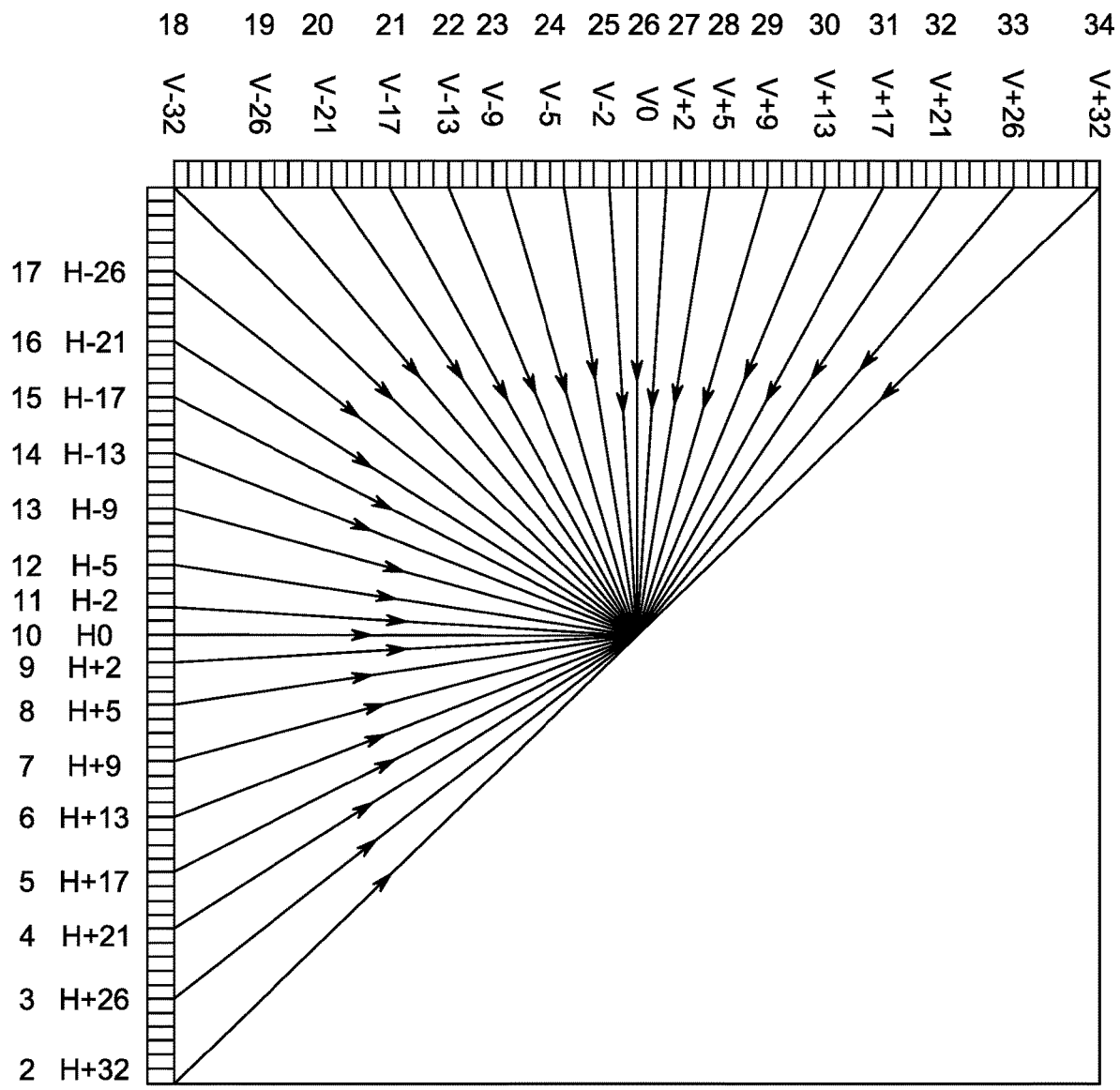
FIG. 2B is a pictorial example depicting intra prediction directions and the corresponding modes in HEVC.

The next step, i.e., the intra sample prediction, consists of predicting the pixels of the target CU based on the reference samples. In order to predict different kinds of content efficiently, HEVC supports a range of prediction modes. In particular, planar and DC prediction modes are used to predict smooth and gradually changing regions, whereas directional prediction modes (also referred to as "angular prediction modes") are used to capture different directional structures. HEVC supports 33 directional prediction modes which are indexed from 2 to 34. These prediction modes correspond to different prediction directions as illustrated in FIG. 2B, wherein the numbers (i.e., 2, 3, . . . , 34) denote intra prediction mode indices. The prediction modes 2-17 are denoted as horizontal prediction modes (H−26 to H+32), as the predominant sources of prediction is in horizontal direction. The modes 18-34 are denoted as vertical prediction modes (V−32 to V+32) accordingly. "H" and "V" in FIG. 2B are used to indicate the horizontal and vertical directionalities, respectively, while the numeric part of the identifier indicates the pixels' displacement (also referred to as "angle parameter") at 1/32 pixel fractions.

Table 1 below shows the relationship between the directional prediction mode and the angle parameter A as specified by HEVC:

TABLE 1

| | Horizontal directions | | | | | | | | | | | | | | | |
|---|---|---|---|---|---|---|---|---|---|---|---|---|---|---|---|---|
| Mode index | 2 | 3 | 4 | 5 | 6 | 7 | 8 | 9 | 10 | 11 | 12 | 13 | 14 | 15 | 16 | 17 |
| A | 32 | 26 | 21 | 17 | 13 | 9 | 5 | 2 | 0 | −2 | −5 | −9 | −13 | −17 | −21 | −26 |
| | Vertical directions | | | | | | | | | | | | | | | |
| Mode index | 18 | 19 | 20 | 21 | 22 | 23 | 24 | 25 | 26 | 27 | 28 | 29 | 30 | 31 | 32 | 33 | 34 |
| A | −32 | −26 | −21 | −17 | −13 | −9 | −5 | −2 | 0 | 2 | 5 | 9 | 13 | 17 | 21 | 26 | 32 |

The directions with non-negative displacements (i.e., H0 to H+32 and V0 to V+32) are also denoted as positive directions, and the directions with negative displacements (i.e., H−2 to H−26 and V−2 to V−32) are also denoted as negative directions. Positive prediction directions may also be defined as directions having positive A value, and negative prediction directions may be defined as directions having negative A values.

As shown in FIG. 2B, the defined angular directions have a sample accuracy of 1/32. That is, the interval between two pixels, either in horizontal or vertical directions, is divided into 32 subintervals. As described above, the defined directions can be distinguished as either vertical or horizontal. The prediction modes in horizontal directions use either only left reference samples, or some left and some top reference samples. Similarly, the prediction modes in vertical directions use either only top reference samples, or some top and some left reference samples. The horizontal positive directions from H0 to H+32 use only the left reference samples for prediction. Similarly, the vertical positive directions from V0 to V+32 use only the top reference samples for prediction. Negative horizontal and vertical directions (H−2 to H−26 and V−2 to V−32) use reference samples both on the left and on the top for prediction.

Figure 2C:
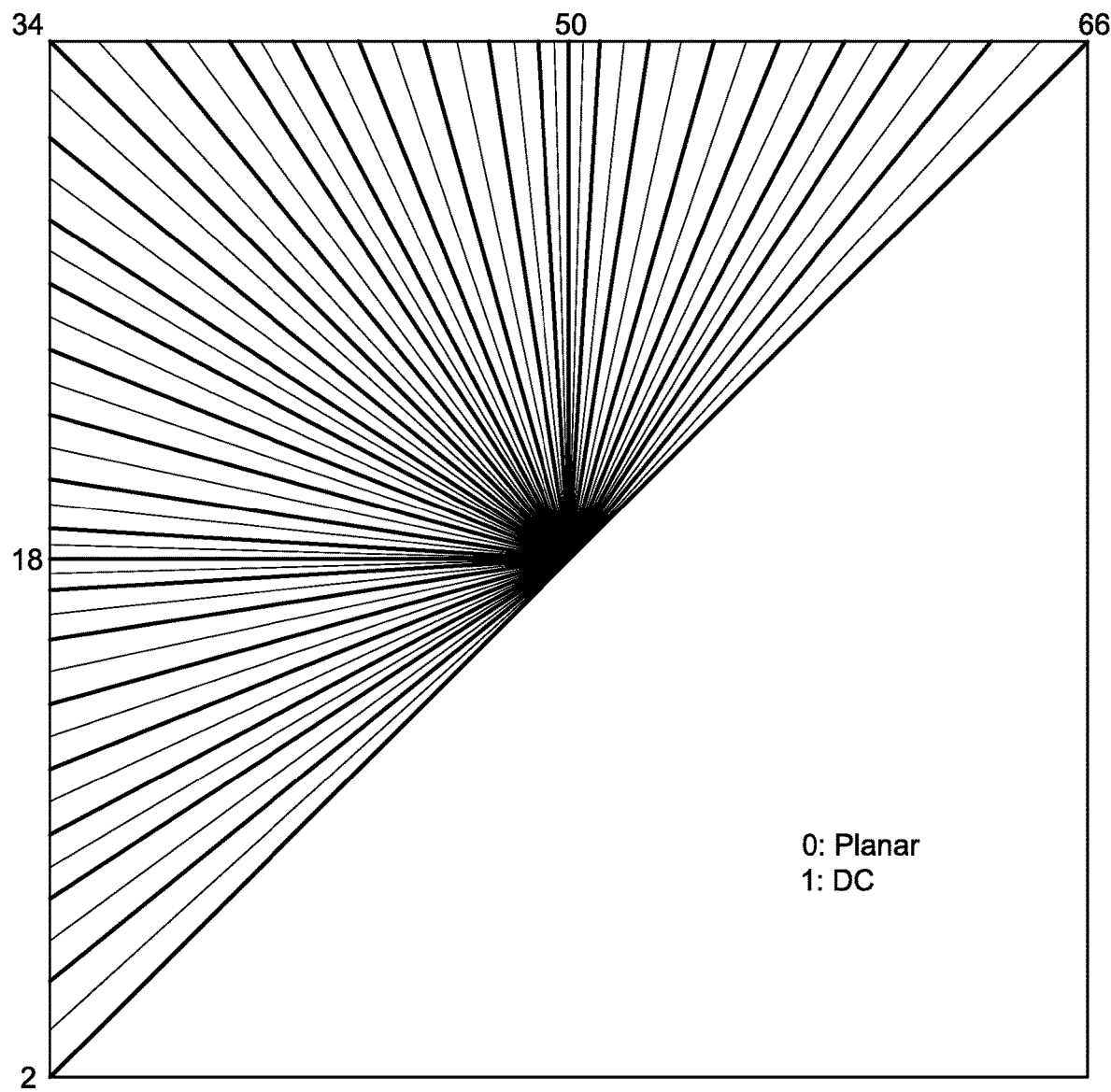
FIG. 2C is a pictorial example depicting intra prediction directions and the corresponding modes in JEM.

In JEM, current proposals increase the number of the intra prediction modes compared with HEVC. For example, as shown in FIG. 2C, JEM 3.0 uses 65 directional intra prediction modes in addition to the planar mode 0 and the DC mode 1. The directional intra prediction modes are numbered from 2 to 66 in the increasing order, in the same fashion as done in HEVC from 2 to 34 as shown in FIG. 2B. The 65 directional prediction modes include the 33 directional prediction modes specified in HEVC plus 32 additional directional prediction modes that correspond to angles in-between two original angles. In other words, the prediction direction in JEM has twice the angle resolution of HEVC. Higher number of prediction modes have been proposed to exploit the possibility of finer angular structures with proposed larger block sizes.

In HEVC reference code, a reference array is first constructed using the top and left reference samples. For vertical predictions, the reference array is horizontal (i.e., a row of reference samples) and for horizontal predictions, the reference array is vertical (i.e., a column of reference samples). For the modes with positive directions and positive angle parameter A (modes 2 to 10 and 26 to 34), the reference array is simply the top or left reference samples depending on the direction:

TopRef[$x$]=$P$[$x$−1][−1],0≤$x$≤2$N$, for vertical predictions

LeftRef[$y$]=$P$[−1][$y$−1],0≤$y$≤2$N$, for horizontal predictions where N is the CU size. It is conventional to initialize the sample coordinates to (0, 0) at the top-left pixel of the target CU. Therefore, the top reference samples will have their y-coordinate as −1 and the left reference samples will have their x-coordinate as −1, as shown in FIG. 2A.

For the modes with negative directions and negative angle parameter A (modes 11 to 25), the reference array needs pixels from both the top and left reference arrays. In this case, the reference array will extend to the negative indices beyond 0. Sample values on the reference array with positive indices are obtained as above depending on vertical or horizontal prediction. Those on the reference array with negative indices are obtained by projecting the left (for vertical predictions) or top reference pixels (for horizontal predictions) on the reference array in the prediction direction.

Once the reference array is constructed, the prediction at any pixel position (x,y) inside the target CU is obtained by projecting the pixel position to the reference array along the selected direction and then copying the reference array sample value at (x,y). The reference sample value is computed at a sample resolution of (1/32) by interpolating between two adjacent samples as illustrated below:

$P[x][y]=((32-f)*\text{topRef}[x+i+1]+f*\text{topRef}[x+i+2]+16)\gg 5)$,

0≤x,y<N, for vertical predictions;

$P[x][y]=((32-f)*\text{leftRef}[y+i+1]+f*\text{leftRef}[y+i+2]+16)\gg 5)$,

0≤x,y<N, for horizontal predictions, where i and f denote the integral part and the fractional part of the projected displacement from the pixel location (x, y). If Δ denotes the projected displacement, then Δ=(x+1)*A, for horizontal predictions, and Δ=(y+1)*A, for vertical predictions.

The integral and fraction parts of the displacement are then obtained as follows:

i=Δ≫5, f=Δ&31.

Notice that, if f=0 (that is, there is no fractional part), then the prediction is equal to the reference array sample value in the direction of prediction. In this case, there is no need of interpolation.

In JEM, the above interpolation is replaced by filtering with a 4-tap filter. If the width (height) of the current block is 4 or 8, then the chosen filter is a 4-tap cubic filter for a vertical (horizontal) prediction mode, otherwise it is a 4-tap Gaussian filter. The filter coefficients depend on the fractional part f. For different values of f, there are different sets of filter coefficients depending on the distance of the predictor sample from the four reference samples. The predictor is the sample that is used for prediction of the target pixel. In JEM, the predictor is computed at a sample resolution of (1/64), for example, i=Δ≫6, f=Δ & 63. If f≠0, and denoting the filter coefficients as h[0], h[1], h[2], and h[3] for the corresponding f, the predictor sample is interpolated as:

$P[x][y]=(h[0]*\text{topRef}[x+i]+h[1]*\text{topRef}[x+i+1]+h[2]*\text{topRef}[x+i+2]+h[3]*\text{topRef}[x+i+3]+128)\gg 8)$, 0≤x,y<N, f>0, for vertical predictions;

$P[x][y]=(h[0]*\text{leftRef}[y+i]+h[1]*\text{leftRef}[y+i+1]+h[2]*\text{leftRef}[y+i+2]+h[3]*\text{leftRef}[y+i+3]+128)\gg 8)$, 0≤x, y<N, f>0, for horizontal predictions.

The filtering includes a scaling by 256 since the sum of the filter coefficients, which have integral values, is always 256. On the other hand, if f=0, then there is no need of interpolation and the reference sample in the prediction direction is used as the predictor.

Some of the prediction modes such as the DC mode and directly horizontal (i.e., mode 10 in HEVC, mode 18 in JEM) and directly vertical modes (i.e., mode 26 in HEVC, mode 50 in JEM) may cause discontinuity at the CU boundaries of the prediction samples. Therefore, in HEVC, as well as in JEM, such prediction modes are followed by a post-processing step where the boundary of the predicted samples are smoothed using a low-pass filter. Here, directly horizontal mode refers to the prediction mode when the reference samples on the left side of a target block are repeated horizontally to the right for intra prediction. Similarly, directly vertical mode refers to the prediction mode when the reference samples on the top of a target block are repeated vertically down for intra prediction.

Since there are multiple intra prediction modes available, the decoder needs the mode information to form the prediction for an intra-coded CU. The encoder encodes the mode information using a most probable mode (MPM) set for the luma component. HEVC specifies an MPM set consisting of three distinct modes, which is constructed from the prediction modes of the intra coded CUs on the top and left of the current CU, the planar mode, the DC mode, and the directly vertical mode.

The applicable luma intra prediction mode for the current block may be coded using two different options. If the applicable mode is included in the constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks, the planar mode, the DC mode, and the directly vertical mode.

Figure 4:
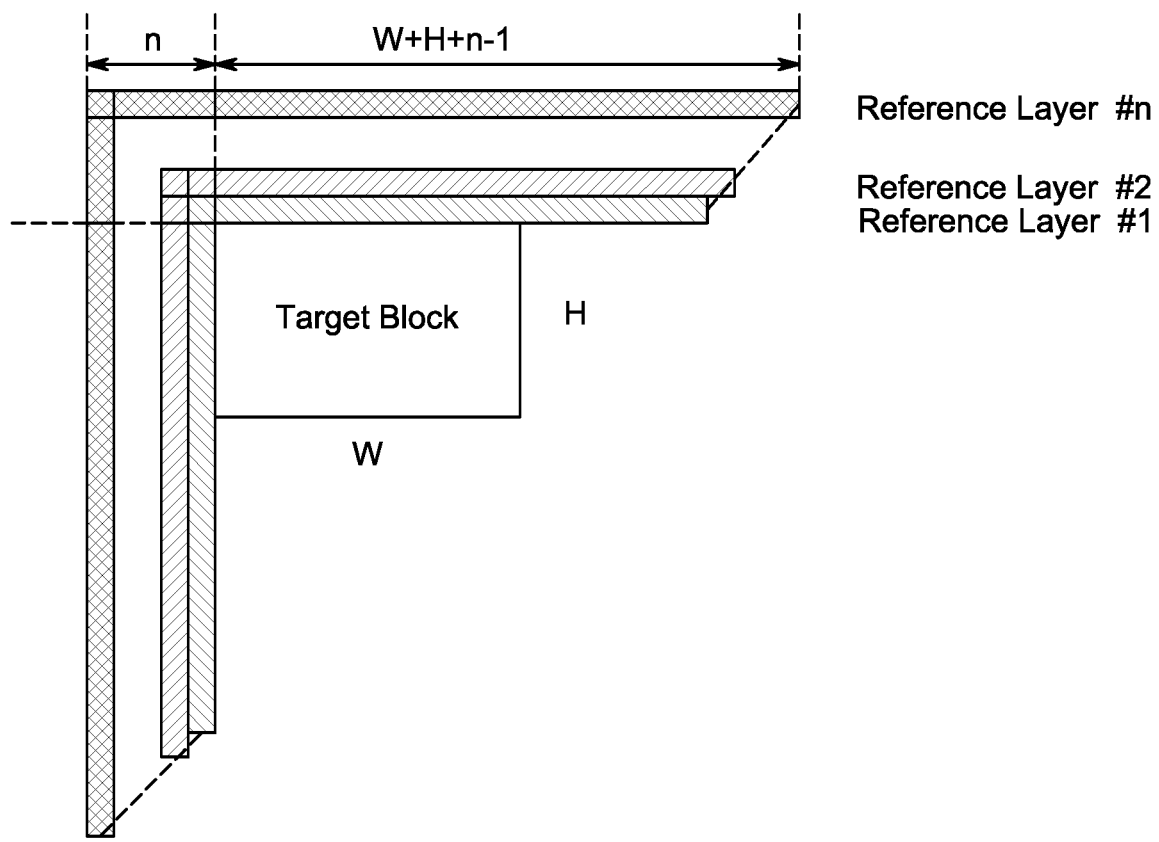
FIG. 4 illustrates pictorially an exemplary concept of multi-reference intra prediction in which reference layer n refers to the nth reference row and column.

Multi-reference intra prediction refers to the intra prediction using multiple rows and columns of reference pixels. An example of multi-reference intra prediction is shown in FIG. 4. It is also called arbitrary tier reference intra prediction or multi-line intra prediction. At the encoder, for a given prediction mode, a target block is first predicted using each reference layer. Then the reference layer producing the best RD (Rate-Distortion) performance is signaled to the decoder so that the decoder uses the same reference layer as the encoder. The prediction with any reference layer may be made in the same manner as done in HEVC, or predictions made from the reference layers farther from the target block may be improved by compensating for the residues for the reference layers closer to the target block. These two proposals require high complexity at the encoder since the encoder has to check the RD cost for the prediction from each layer. In fact, the complexity can go up by N-fold for N reference layers since the RD cost calculation is the most complex task at the encoder.

As mentioned earlier, the aim of intra prediction is to predict the target block content as closely as possible using the reference array. The reference array contains the reference samples only at integral locations. However, the predictor samples for certain pixels with some angular prediction mode may lie at an intermediate location between two reference samples. This makes it necessary to interpolate such predictor values using the reference array samples, as described previously. If we have multiple reference arrays, this interpolation accuracy may be improved because of the underlying assumption of directionality of the video content.

Figure 5A:
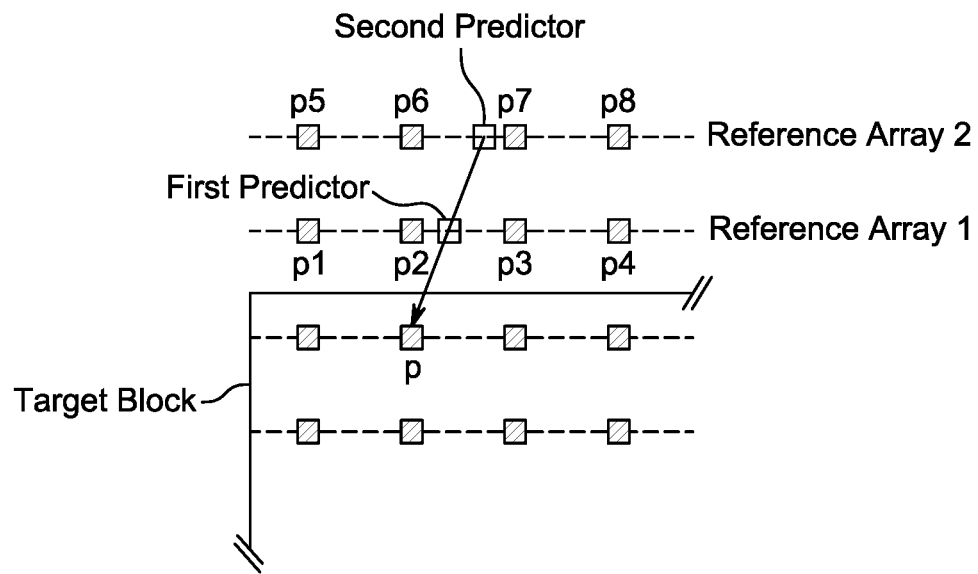
FIG. 5A illustrates intra prediction using two reference arrays, with the prediction direction extended to obtain the predictor on the second reference array for a target pixel.

Consider a vertical angular prediction mode when the predictor sample for a target pixel is in-between two reference samples on the top reference array as shown in FIG. 5A. In this case, in HEVC, the predictor sample will be linearly interpolated, as mentioned previously, using the reference samples p2 and p3 in FIG. 5A. In JEM, the predictor sample will be interpolated after filtering the four reference samples p1, p2, p3, p4 in FIG. 5A. The predictor sample, in this case, is just an estimate. If we extend the prediction direction by one more row, the line will cross the second row at a different point. We may, likewise, interpolate a second predictor for the target pixel by using either only the reference samples p6 and p7 in the reference array 2, or the four reference samples p5, p6, p7, and p8 in the reference array 2.

Figure 5B:
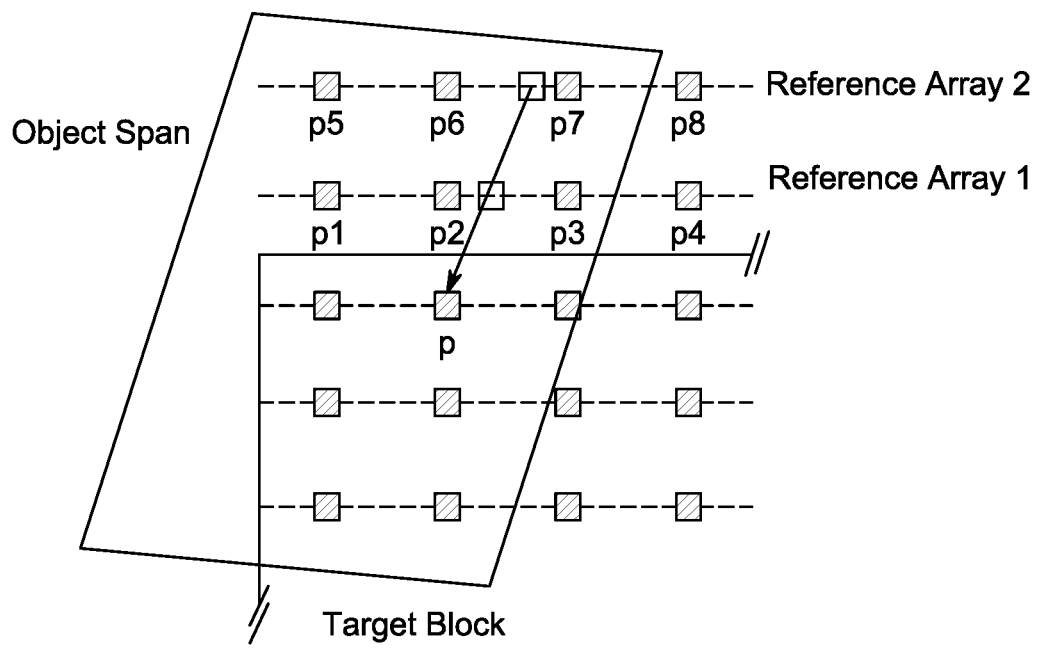
FIG. 5B illustrates another intra prediction using two reference arrays, but with the target block containing only a part of an object with a directionality.

To understand the directionality effect, consider the case when an object partially covers a target block and the reference arrays, as shown in FIG. 5B. In this case, using the 4-tap filter for interpolating the predictor sample will lead to an inaccurate estimate since the reference sample p4 does not belong to the same object as the reference samples p1, p2 and p3, even though they all belong to the reference array 1. On the other hand, if we interpolate the predictor using the four reference samples: p2 and p3 in the reference array 1, and p6 and p7 in the reference array 2, it will lead to a more accurate estimate.

Accordingly, an underlying idea for the present embodiments is that along a prediction direction, the intensity value on an object remains unchanged or does not change drastically. This is also the underlying assumption for copying the reference sample values along the prediction direction for making the prediction. The reference samples on the second reference array along the prediction direction are more correlated with the reference samples on the first reference array that are further away from the projection line. On very rare cases, there may be object boundaries falling exactly on the first reference array which will cause the reference samples p6 and p7 in the reference array 2 not to belong to the same object. These scenarios may be optionally detected using heuristics if required as to be described later.

Again, a basic recognition or concept according to the present embodiments is to interpolate the predictor samples using samples from multiple reference arrays along the prediction direction. Even though the current concept may be applied to any number of reference arrays, but for clarity of presentation and keeping a practical and efficient implementation in view, we present our exemplary embodiments here using only two reference arrays. Therefore, for making the intra prediction, we will form top and left reference arrays as done in HEVC or JEM. We will refer to them as reference array 1, reference array 2, and so on as shown in, e.g., FIG. 5A and FIG. 5B. Note that reference array n, n=1, 2, . . . may mean either the top reference array, or the left reference array, depending on if the prediction mode corresponds to a vertical or horizontal direction, respectively.

However, since the horizontal predictions may be implemented as vertical predictions after swapping the top reference array and left reference array, and swapping the height and the width of the target block, we will illustrate the present embodiments using only the vertical predictions. Accordingly, we first generate the reference samples following the reference sample generation algorithm in HEVC or JEM. Then we form the reference arrays using those samples. For the modes with positive angle parameter A (modes 2 to 10 and 26 to 34 in HEVC, modes 2-18 and 50-66 in JEM), the reference array n is simply the top reference samples of reference layer n as shown e.g., in FIG. 4, with reference array 1 being the reference array closest to the block of the video data:

$$\text{Ref}_n[x]=P[x-n][-n], 0 \leq x \leq W+H+2n-2, n=1,2,3,\ldots$$

For the modes with negative angle parameter A (modes 11 to 25 in HEVC, modes 19 to 49 in JEM), sample values on a reference array with positive indices are obtained as above and those with negative indices are obtained by projecting the left reference pixels of the corresponding reference layer on the same reference array along the prediction direction.

Note that it may not be necessary to project an entire reference array at the decoder. We may just need to project only the required samples. The required samples depend on the prediction mode.

Figure 6:
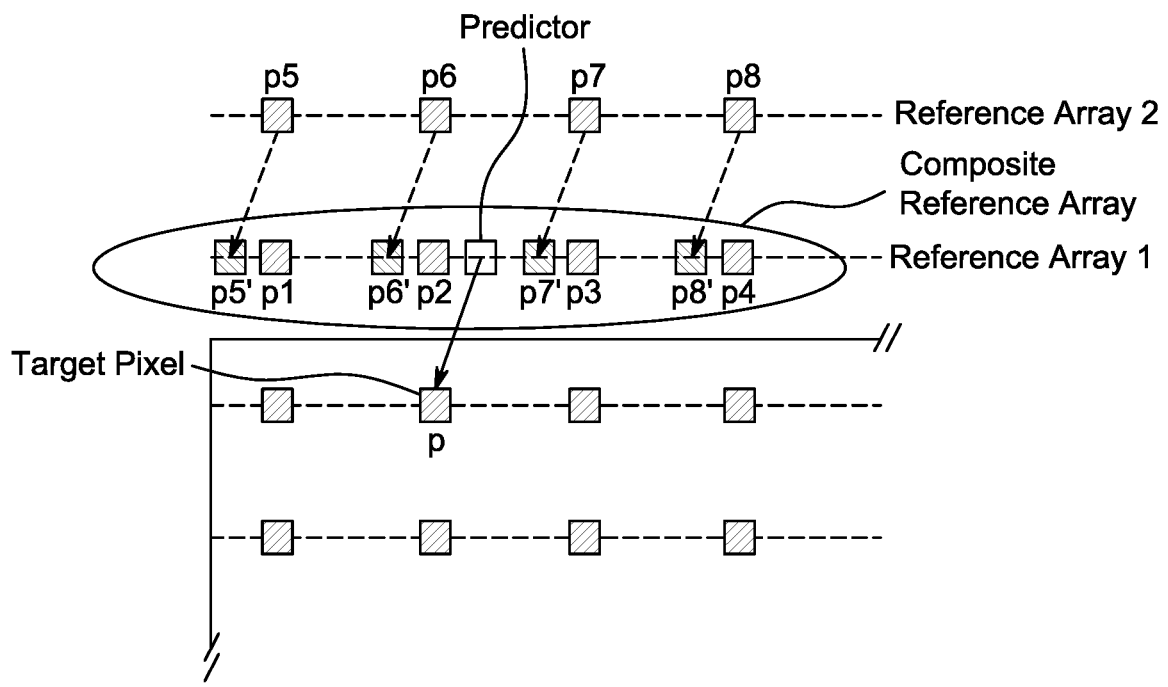
FIG. 6 illustrates a composite reference array formed by projecting along an intra prediction direction one of the reference arrays onto the reference array closest to a target block of video data.

Consider a vertical angular prediction where a target pixel has a predictor sample at a fractional distance on the reference array 1, as shown in FIG. 6. In JEM, the four samples p1, p2, p3, and p4 in the reference array 1 will be filtered to interpolate the predictor. However, according to one of the present embodiments, we first construct a composite reference array consisting of samples from both the reference array 1 and the reference array 2 shown in FIG. 6. That is, the samples from the reference array 2 are projected onto the reference array 1 along the prediction direction of the intra prediction mode. For most angular prediction modes, the projections of the samples from the reference array 2 onto the reference array 1 will result in the reference samples being alternated from the two reference arrays, as shown in FIG. 6. That is, the composite reference array will contain alternate samples from both reference arrays. Our aim is to use the closest reference samples (e.g., four closest samples) on the composite array to interpolate the predictor.

The interpolation may be done using an interpolation filter as in, e.g., JEM. Furthermore, even though the interpolation filter may be of any finite order larger than or equal to 2, but for the sake of illustration, we present the present embodiments using a Gaussian filter of order 4. Considering the difficulty in computing the coefficients of this filter, we start with the 4-Tap Gaussian filter used in JEM and then present methods to compute the coefficients of this filter used for the interpolation.

Note that, for strictly vertical (mode 26 in HEVC and mode 50 in JEM) and strictly horizontal (mode 10 in HEVC and mode 18 in JEM) modes, all target pixels have predictors at integral positions. Similarly, for vertical diagonal (mode 34 in HEVC and mode 66 in JEM), diagonal-up (mode 2 in both HEVC and JEM), and diagonal-down (mode 18 in HEVC and mode 34 in JEM) modes, all target pixels will have predictors at integral positions. For these prediction modes, we use only the first reference array, as done in the JEM code, as there is no need of interpolating the predictor samples.

The spacing between the samples on the composite array is not uniform (except for a prediction mode where the reference samples from the second reference array are projected exactly mid-way between those on the first reference array). Therefore, we cannot use the 4-Tap Gaussian filter used in JEM as is. Furthermore, we notice that the spacing between the samples from the first reference array and the second reference array varies with the prediction mode. This makes it difficult to compute the filter coefficients as done normally for Gaussian filters. In the following, we propose exemplary calculation methods to compute the filter coefficients using the existing 4-Tap Gaussian filter.

For the 4-tap Gaussian filter used in JEM, the parameter values, h[0], h[1], h[2], h[3], are tabulated for different values of f, as f goes from 0 to 63 (with 1/64 sample resolution). Hence, the calculated table would contain 64 sets of values, {h[0], h[1], h[2], h[3]}, as shown and calculated below:

```
{
{h[0], h[1], h[2], h[3]}, // for f=0
{h[0], h[1], h[2], h[3]}, // for f = 1
...
{h[0], h[1], h[2], h[3]}, // for f=63
}
```

Figure 7:
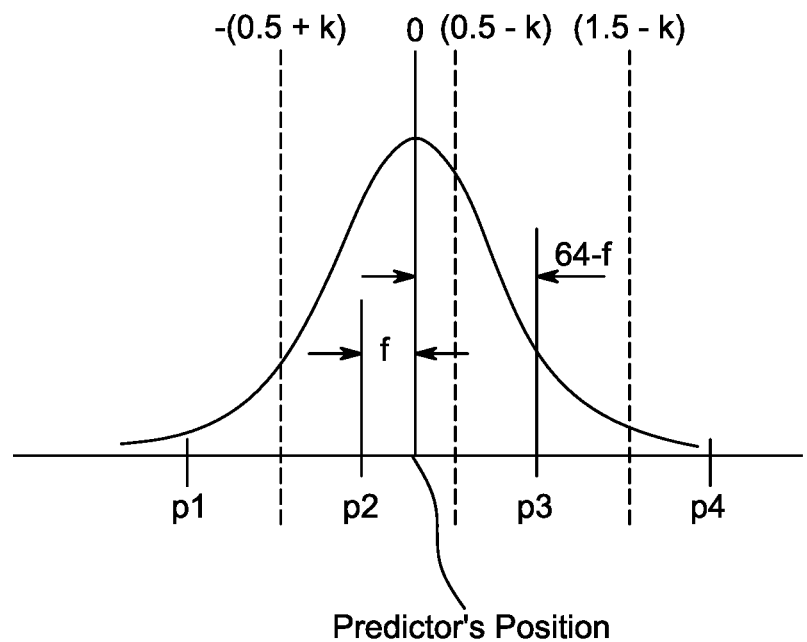
FIG. 7 illustrates pictorially the generation of the filter coefficients of a 4-tap Gaussian filter based on the position of the predictor.

Or the 4-tap filter may be designed as shown in FIG. 7:

$$k \equiv f/64$$

$$h'[0] = \int_{-\infty}^{-(0.5+k)} \frac{1}{\sqrt{2\pi\sigma^2}} e^{-\frac{x^2}{2\sigma^2}} dx$$

$$h'[1] = \int_{-(0.5+k)}^{(0.5-k)} \frac{1}{\sqrt{2\pi\sigma^2}} e^{-\frac{x^2}{2\sigma^2}} dx$$

$$h'[2] = \int_{(0.5-k)}^{(1.5-k)} \frac{1}{\sqrt{2\pi\sigma^2}} e^{-\frac{x^2}{2\sigma^2}} dx$$

$$h'[3] = \int_{(1.5-k)}^{\infty} \frac{1}{\sqrt{2\pi\sigma^2}} e^{-\frac{x^2}{2\sigma^2}} dx$$

and $$h[0] = \text{round}(h'[0]*256);$$
$$h[1] = \text{round}(h'[1]*256);$$
$$h[2] = \text{round}(h'[2]*256);$$
$$h[3] = \text{round}(h'[3]*256);$$
$$h[0] + h[1] + h[2] + h[3] = 256$$

Method 1

For a given prediction mode and a given target pixel, there can be only two cases as far as the predictor location is concerned. In one scenario, the closer reference pixel on the left of the predictor pixel belongs to the reference array 1, and in the second scenario, the closer pixel is the projection of a sample from the reference array 2. These two cases are respectively illustrated in FIG. 8A and FIG. 8B.

Figure 8A:
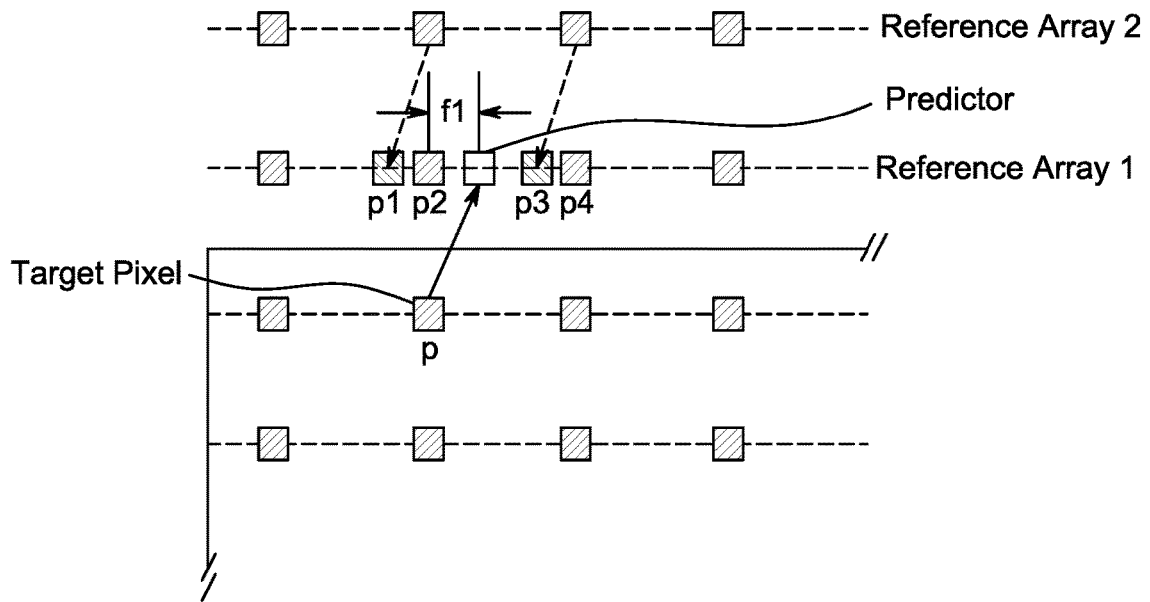
FIG. 8A illustrates the scenario in which the closer reference sample on the left of the predictor belongs to the reference array 1.

FIG. 8A illustrates scenario 1 in which the closer reference sample (i.e., p2) on the left of the predictor belongs to the reference array 1. In scenario 1, we let f1 denote the fractional part of the projected displacement, which is given as:

$$f1 = \Delta_1 \& 63 \tag{1}$$

where $\Delta_1$ denotes the projected displacement on the first reference array. Here "63" is used in Eq. (1) for an interpolation resolution of 64. If other resolution (R) is used, Eq. (1) becomes f1=$\Delta_1$ & (R−1).

Figure 8B:
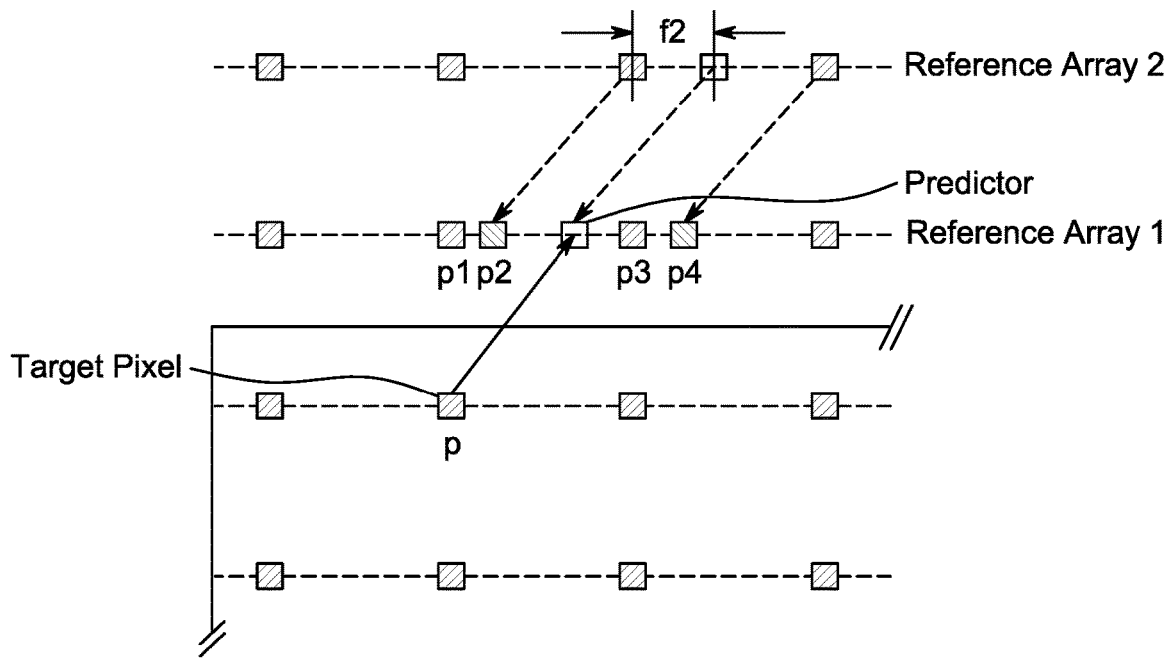
FIG. 8B illustrates the scenario in which the closer reference sample on the left of the predictor belongs to the reference array 2.

FIG. 8B illustrates scenario 2 in which the closer reference sample on the left of the predictor belongs to the reference array 2. In scenario 2, we let f2 denote the fractional part of the projected displacement with respect to the second reference array, which is given as:

$$f2 = \Delta_2 \& 63 \tag{2}$$

where $\Delta_2 = (x+2)*A$ for horizontal predictions, and $\Delta_2 = (y+2)*A$ for vertical predictions. Note that f2 can be calculated in reference array 2, or in the composite array, and the result will be the same because the projection from reference array 2 to reference array 1 does not affect the distance.

Denoting the four nearest reference samples on the composite array as p1, p2, p3, and p4, as shown in FIG. 8A and FIG. 8B, we interpolate the predictor for the target pixel p as:

$$\hat{p} = (h[0]*p1 + h[1]*p2 + h[2]*p3 + h[3]*p4 + 128) \gg 8$$

The filter coefficients h[0], . . . , h[3] are obtained from the value of f1 in scenario 1 and from f2 in scenario 2. That is, in scenario 1, the Gaussian filter corresponds to the f1 value, where as in scenario 2, the Gaussian filter corresponds to the f2 value.

Figure 9:
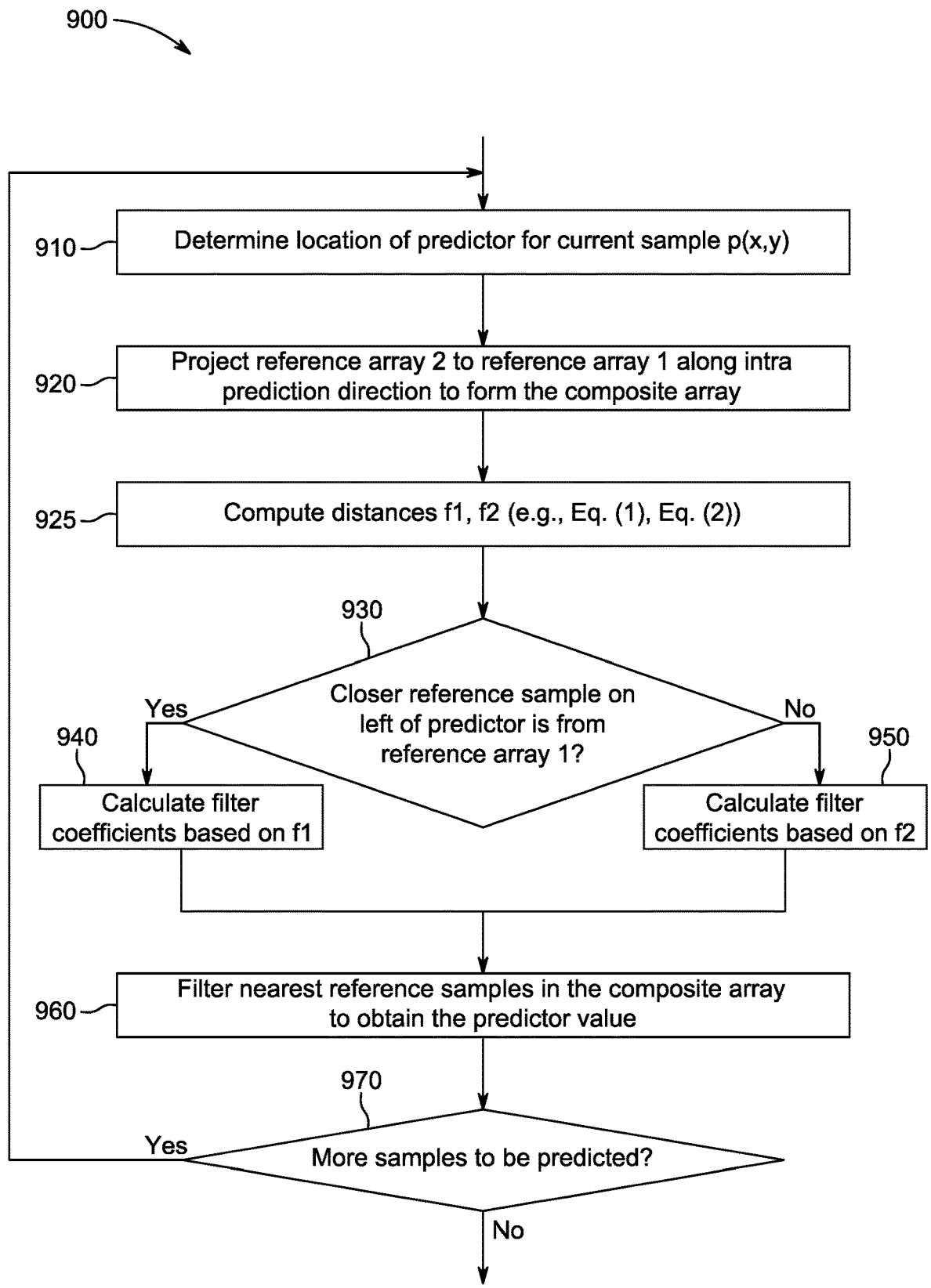
FIG. 9 illustrates an exemplary method of intra prediction, according to an embodiment.

FIG. 9 illustrates an exemplary method 900 for predicting a block using intra prediction, according to an embodiment. The input to method 900 may include a block to be intra predicted and an intra prediction directional mode. Method 900 can be applied at the encoder and decoder.

For a current sample to be predicted, P(x,y), an encoder or decoder can determine (910) the location of the predictor on reference array 1. Reference array 2 can be projected (920), along the intra prediction direction, to reference array 1 to form a composite reference array, e.g., as shown in FIG. 8A and FIG. 8B. The encoder or decoder then computes (925) f1 using Eq. (1) and f2 using Eq. (2), and compares their values. If (930) the closer reference sample is from reference array 1 (that is f1 is smaller), then f1 is used (940) to determine the filter coefficients. Otherwise, f2 is used (950) to determine the filter coefficients. Then four samples in the composite array nearest to the predictor are filtered (960) to obtain the predictor value. The process continues if there are more samples in the block to be predicted (970). Otherwise, the intra prediction for the block is completed and the predicted block is ready.

Method 2

In this method, we first determine the two Gaussian filters for the two reference arrays and then deduce the filter for the composite reference array from them. Accordingly, let h1 $\stackrel{def}{=}$ (h1[0], h1[1], h1[2], h1[3]) and h2 $\stackrel{def}{=}$ (h2[0], h2[1], h2[2], h2[3]) denote the two Gaussian filters for the fractional parts f1 and f2 respectively, for example, as specified in JEM. We compute four coefficients for the composite reference array as:

$$h11 = h1[0] + h1[1],$$

$$h12 = h1[2] + h1[3],$$

$$h21 = h2[0] + h2[1],$$

$$h22 = h2[2] + h2[3].$$

Using these coefficients, we interpolate the predictor for the target pixel p as:

$$\hat{p} = (h21*p1 + h11*p2 + h22*p3 + h12*p4 + 256) \gg 9 \text{ for scenario 1, and} \qquad (3)$$

$$\hat{p} = (h11*p1 + h21*p2 + h12*p3 + h22*p4 + 256) \gg 9 \text{ for scenario 2} \qquad (4)$$

If we were to use only a 2-tap Gaussian filter with the two nearest reference samples, then h11 and h12 would represent the filter coefficients to be used with the reference samples from reference array 1. Similarly, h21 and h22 would represent the two Gaussian filter coefficients to be used with the reference samples from reference array 2. Therefore, the filtering in Eq. (3) or Eq. (4) represents an average of filtering with 2-tap Gaussian filters applied on the two reference arrays.

Figure 10:
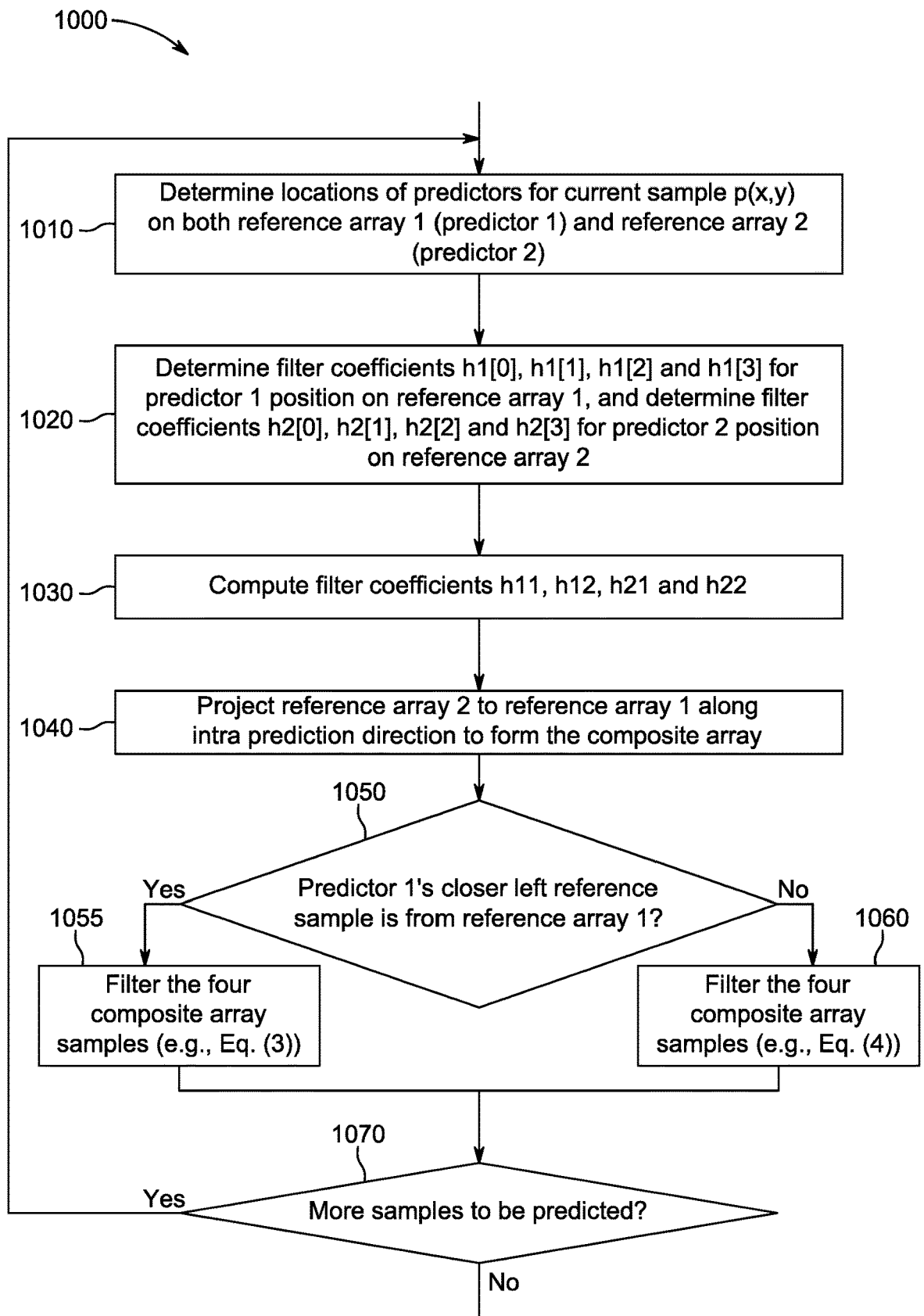
FIG. 10 illustrates an exemplary method of intra prediction, according to another embodiment.

FIG. 10 illustrates an exemplary method 1000 for predicting a block using intra prediction, according to another embodiment. Similar to method 900, the input to method 1000 may include a block to be intra predicted and an intra prediction directional mode. Method 1000 can be applied at the encoder and decoder.

For a current sample to be predicted, P(x,y), an encoder or decoder can compute (1010) f1 and f2. Based on the value of f1, a first set of filter coefficients (h1[0], h1[1], h1[2] and h1[3]) can be determined (1020). Similarly, a second set of filter coefficients (h2[0], h2[1], h2[2], h2[3]) can be determined (1020) using the value f2. Then filter coefficients h11, h12, h21 and h22 may be calculated, for example, as described above.

Reference array 2 can be projected (1040), along the intra prediction direction, to reference array 1 to form a composite reference array, e.g., as shown in FIG. 8A and FIG. 8B. Based on the values of f1 and f2, the encoder or decoder then decides (1050) whether the closer reference sample to the left of the predictor is from reference array 1 or reference array 2. If the closer reference sample is from reference array 1 (that is f1 is smaller), then four samples in the composite array nearest to the predictor are filtered (1055) to obtain the predictor value, for example, using Eq. (3). Otherwise, if the closer reference sample is from reference array 2 (that is f2 is smaller), then four samples in the composite array nearest to the predictor are filtered (1060) to obtain the predictor value, for example, using Eq. (4). The process continues if there are more samples in the block to be predicted (1070). Otherwise, the intra prediction for the block is completed and the predicted block is ready. Thus, reference samples from multiple reference arrays along the direction of prediction are used for computing the predictor, instead of using all samples on the first reference array.

Method 3

In this method, in the first step, we determine the two Gaussian filters for the two reference arrays as in Method 2. Then we follow the same computations as in Method 2 to get the intermediate values h11,h12,h21, and h22. Then, in scenario 1, we obtain the filter coefficients as:

$$h[0] = (h11*h2[0] + 128) \gg 8,$$

$$h[1] = (h11*h2[1] + 128) \gg 8,$$

$$h[2] = (h12*h2[2] + 128) \gg 8,$$

$$h[3] = (h12*h2[3] + 128) \gg 8. \qquad (5)$$

In scenario 2, we obtain the filter coefficients as:

$$h[0] = (h21*h1[0] + 128) \gg 8,$$

$$h[1] = (h21*h1[1] + 128) \gg 8,$$

$$h[2] = (h22*h1[2] + 128) \gg 8,$$

$$h[3] = (h22*h1[3] + 128) \gg 8. \qquad (6)$$

Using these values, we interpolate the predictor for the target pixel p as:

$$\hat{p} = \frac{(h[0]*p1 + h[1]*p2 + h[2]*p3 + h[3]*p4 + iSum/2)}{iSum} \qquad (7)$$

where iSum=(h[0]+h[1]+h[2]+h[3]) and p1, p2, p3, and p4 are the four reference pixels on the composite array. Note that the sum of the filter coefficients here need not be a power of 2.

The intra prediction according to "Method 3" can be performed in a process similar to method 1000, with some changes in the filtering. In particular, step 1055 may be adjusted to obtain filter coefficients using Eq. (5) and filter using Eq. (7), and step 1060 may be adjusted to obtain filter coefficients using Eq. (6) and filter using Eq. (7).

As we mentioned earlier, if we were to use only a 2-tap Gaussian filter with the two nearest reference samples, then h11 and h12 would represent the filter coefficients to be used with the reference samples on reference array 1. Now, when the two reference samples from reference array 2 are projected onto reference array 1 and we have scenario 1, we can derive the resulting filter coefficients (h[0] and h[1]) for the samples p1 and p2 from h11 in the proportion of coefficients h2[0] and h2[1], as in Eq. (5). Note that, in the case of a Gaussian filter, the filter coefficients represent the probabilities assigned to the corresponding samples to be filtered, and all coefficients are positive. Similarly, we can derive the filter coefficients (h[2] and h[3]) for the samples p3 and p4 from h12 in the proportion of coefficients h2[2] and h2[3], as in Eq. (5). Similarly, in scenario 2, we use the filter coefficients h21 and h22, since the left reference sample from the second reference array is nearer. Note that the resulting coefficients represent only approximate values for the filter coefficients on a composite array. However, unlike Method 2, which uses only an average of two 2-tap Gaussian filters, Method 3 computes the coefficients taking the locations of the reference samples on the composite array into account.

In Methods 1-3, a composite array is used to illustrate the concept of interpolation using samples from different reference arrays. By using the concept of composite array, the interpolation filter is designed by taking into consideration of the distances between the reference samples from different reference arrays and the predictor sample. Namely, the filter coefficients for the reference samples, which may be from different reference arrays, can be designed to give more weights to reference samples that are closer to the projection line and therefore enable more accurate intra prediction. In some embodiments, the above methods can be implemented using the reference samples from reference arrays directly, without actually forming the composite reference array. Recall that our aim was to interpolate the predictor using the reference samples from multiple reference arrays along the prediction direction instead of using all four reference samples from the first reference array only. Ideally we would use a 2D Gaussian filter to interpolate the predictor. However, determining the filter coefficients, in this case, is not an easy task, as it depends on the prediction direction as well as the locations of the predictor on the reference arrays. The concept of a composite array is presented here in order to illustrate the used reference samples from different reference arrays as well as to derive the approximate filter coefficients as presented in Methods 1-3.

In the construction of a composite reference array, there is an underlying assumption that the object intensity remains constant or changes slowly along their directionalities over the considered reference arrays. If we allowed the object intensity to change along their directionalities, it will necessitate projections of samples from the second reference array onto the composite reference array with weights. This can be, equivalently, be achieved by weighing the corresponding filter coefficients.

The exemplary methods presented above are just a few of the techniques able to obtain the filter coefficients for the interpolation filter being used. In general, the predictor may be interpolated as:

$$\hat{p}=(h[0]*p1+h[1]*p2+\ldots+h[L-1]*pL)$$

where L denotes the length of the filter. Note that we have assumed that the coefficients are normalized. For fixed-point implementations, as in the methods above, the expression needs to be normalized by a proper scaling factor.

Figure 11:
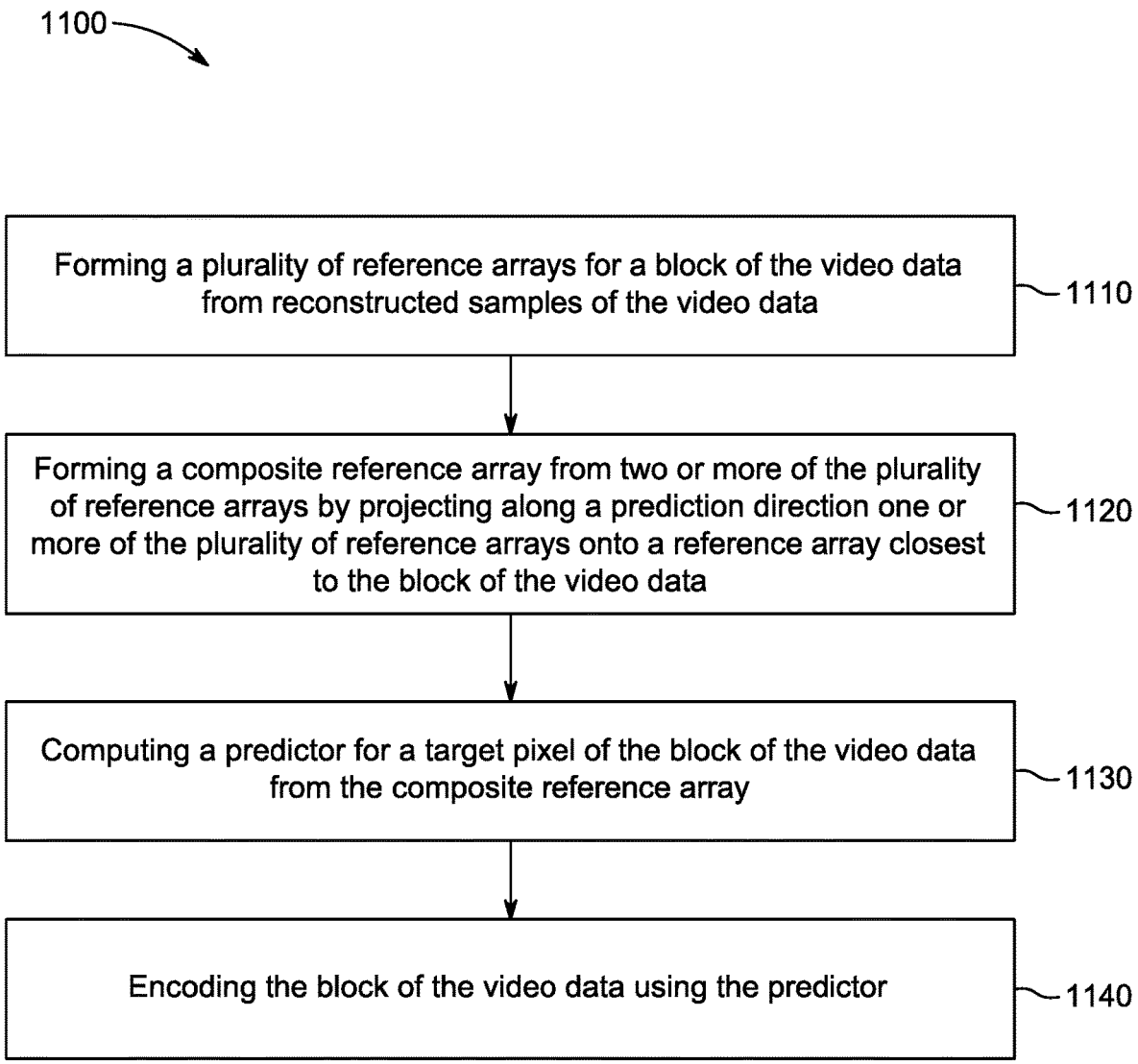
FIG. 11 illustrates an exemplary method of video encoding, according to an embodiment.

FIG. 11 illustrates an exemplary encoding method 1100 performed by an encoder (e.g., encoder 100 in FIG. 1) for encoding video data, according to an embodiment. At step 1110, the encoder forms a plurality of reference arrays for a block of the video data from reconstructed samples of the video data. At step 1120, the encoder forms a composite reference array from two or more of the plurality of reference arrays by projecting along a prediction direction one or more of the plurality of reference arrays onto a reference array closest to the block of the video data. At step 1130, the encoder computes a predictor for a target pixel of the block of the video data from the composite reference array. At step 1140, the encoder encodes the block of the video data using the predictor.

Figure 12:
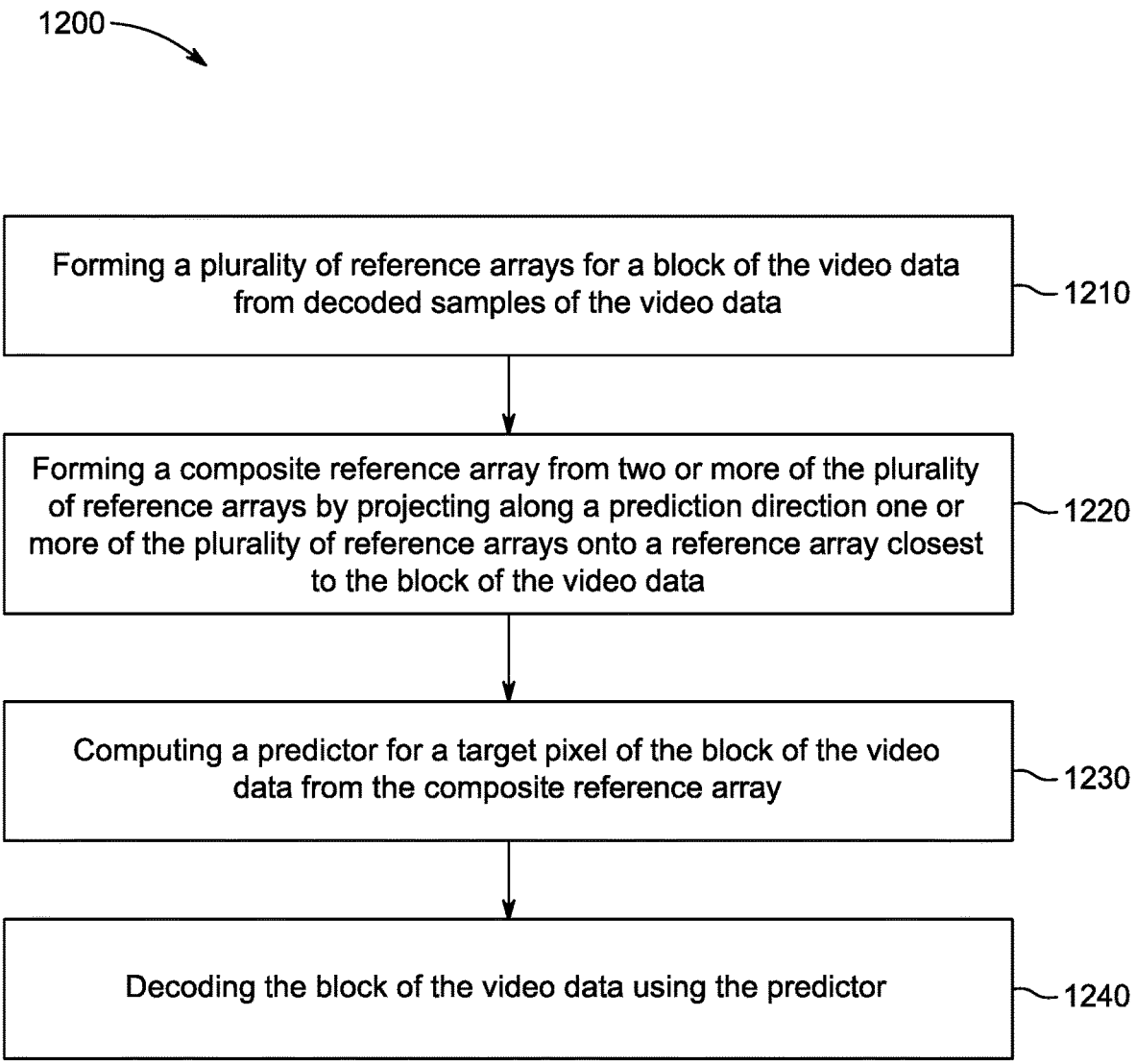
FIG. 12 illustrates an exemplary method of video decoding, according to an embodiment.

FIG. 12 illustrates an exemplary decoding method 1200 performed by a decoder (e.g., decoder 300 in FIG. 3) for decoding video data, according to an embodiment. At step 1210, the decoder forms a plurality of reference arrays for a block of the video data from decoded samples of the video data. At step 1220, the decoder forms a composite reference array from two or more of the plurality of reference arrays by projecting along a prediction direction one or more of the plurality of reference arrays onto a reference array closest to the block of the video data. At step 1230, the decoder computes a predictor for a target pixel of the block of the video data from the composite reference array. At step 1240, the decoder decodes the block of the video data using the predictor.

In the following, we present several additional embodiments that use the proposed intra prediction with the multiple arrays of references to form a composite reference array. We present our embodiments based on the present JEM codec. The intra-prediction tools such as Position Dependent Intra Prediction Combination (PDPC) and Reference Sample Adaptive Filtering (RSAF) in the current JEM codecs, are assumed deactivated, or activated whenever a target block uses a single reference layer for intra prediction instead.

Additional Embodiment 1

In a non-limiting embodiment, for predicting a target block using any angular intra prediction mode, we use two reference arrays. As already mentioned before, the number of reference arrays may be higher than two and variable, but in order to keep the additional complexity low, we use only two reference arrays to illustrate the present example. Before making the prediction, the reference arrays are constructed exactly in the same manner as in JEM, by using the already decoded pixels in the top, top-right, left, left-bottom, and top-left CUs. Then, for a given prediction mode, we construct the composite reference array using the two reference arrays, as already described previously. Now, for each target pixel, we compute a prediction value using either the first reference array or the composite reference array, depending on if the predictor sample coincides with a reference sample on the first reference array or not. That is, if the fractional part of the displacement is zero, we use the reference sample directly from the first reference array as the predictor, otherwise we interpolate the predictor using the composite reference array. We may use any of the calculation methods described before or any other techniques for interpolating the predictor sample. There is no additional signaling required to indicate the reference array used for the prediction, since, for any prediction mode, the decoder knows the reference array used for the target pixel depending on the value of the fractional part of the displacement.

Additional Embodiment 2

In another non-limiting embodiment, we predict a target block as in Additional Embodiment 1 described above, with the difference being that the decision to use the composite reference array or the reference array 1, in the case of a non-zero fractional part of the displacement, is decided by an additional heuristic. For example, we may use the composite reference if the height (or width) of the target block is less than a certain value for a vertical (or horizontal) angular prediction mode, otherwise, we may use only the first reference array. Other possible heuristic measures may be, e.g., the sum of the height and width of the target block, the distance of the target pixel from the predictor, the edge strength at the predictor (to avoid using the reference array 2 in case there is an object edge at the first reference layer), and etc. The decoder may use the same heuristic as the encoder and, hence, the decoder will know which reference array is used for the prediction. Therefore, there is no need of transmitting an additional signaling bit to indicate the prediction method.

Additional Embodiment 3

In yet another non-limiting embodiment, we predict a luma target block in the same manner as in the previous two additional embodiments described above, and also by the standard single reference array method. Between these two predictions, we choose the one that results in better RD performance, and signal the prediction to the decoder using a one-bit flag at the CU level. The signaling flag is context-encoded using either a fixed context, a prediction mode-dependent or neighborhood-dependent context.

For a chroma target block, we may follow one of two possible approaches. In one approach, we may apply the same prediction method (i.e., either multi-reference or single reference) as done for the associated luma target block. In this case, there is no need for transmitting a separate signaling flag for the chroma blocks. The decoder would derive the type of prediction method from the associated luma target block. In the other approach, we may perform both multi-reference and single reference predictions for a chroma target block and choose the one that results in better RD performance. In this case, we signal the prediction method using a one-bit flag at the CU level. Similar to the flag for the luma blocks, the flag may be context-encoded using either a fixed context, a prediction mode-dependent or neighborhood dependent context. For the target blocks which are predicted using a single reference array, other intra prediction tools such as PDPC and RSAF in JEM may be optionally activated. Also, alternatively, the one-bit flag for signaling the selected type of prediction may be signaled at the slice header level, Picture Parameter Set (PPS) header level or Sequence Parameter Set (SPS) header level.

We performed experiments with the JEM code in an all-intra (AI) configuration with only one frame from all VET test sequences. We used 2 reference arrays for predicting a target block as in Additional Embodiment 1 as described previously. For the interpolation of predictor samples, we used all three interpolation methods, Method 1 to Method 3, as described previously. Table 2 to Table 4 below show the BD (Bjøntegaard-Delta)-rate performance of the proposed composite multi-reference intra prediction versus the single reference intra prediction, with the composite reference formed from two reference arrays and the interpolation calculations shown in Methods 1 to 3, respectively.

TABLE 2

Method 1

Over HM-16.6-JEM-2 (parallel)

| | Y | U | V | EncT | DecT |
|---|---|---|---|---|---|
| Class A1 | 0.33% | 0.18% | 0.00% | 101% | 102% |
| Class A2 | 0.24% | 0.52% | 0.08% | 102% | 102% |
| Class B | 0.01% | 0.09% | −0.21% | 100% | 102% |
| Class C | −0.27% | 0.06% | 0.10% | 102% | 105% |
| Class D | −0.32% | 0.78% | −2.06% | 99% | 107% |
| Class E | 0.06% | 0.07% | −0.42% | 101% | 100% |
| Overall | 0.01% | 0.28% | −0.41% | 101% | 103% |

TABLE 3

Method 2

Over HM-16.6-JEM-2 (parallel)

| | Y | U | V | EncT | DecT |
|---|---|---|---|---|---|
| Class A1 | 0.10% | 0.17% | −0.18% | 100% | 99% |
| Class A2 | −0.04% | −0.20% | 0.17% | 98% | 96% |
| Class B | −0.01% | 0.20% | −0.07% | 101% | 100% |
| Class C | −0.13% | −0.24% | −0.32% | 103% | 102% |
| Class D | −0.19% | 0.39% | −1.60% | 101% | 104% |
| Class E | −0.23% | 0.10% | −0.62% | 101% | 99% |
| Overall | −0.07% | 0.08% | −0.41% | 101% | 100% |

TABLE 4

Method 3

Over HM-16.6-JEM-2 (parallel)

| | Y | U | V | EncT | DecT |
|---|---|---|---|---|---|
| Class A1 | 0.27% | 0.28% | 0.25% | 100% | 98% |
| Class A2 | 0.16% | 0.39% | 0.15% | 96% | 100% |
| Class B | 0.08% | −0.13% | −0.62% | 96% | 104% |
| Class C | −0.25% | −0.24% | −1.07% | 97% | 99% |
| Class D | −0.14% | −0.01% | −1.77% | 95% | 98% |
| Class E | −0.15% | −0.25% | −0.23% | 97% | 100% |
| Overall | 0.00% | 0.01% | −0.57% | 97% | 100% |

As can be seen from the above tables, Method 2 interpolation performs the best among the three interpolation methods. Although Method 1 and Method 3 perform nicely for the lower resolution sequences (Class C-E), they lead to BD-rate loss for the higher resolution sequences (Class A1, A2, B). Accordingly, Method 2 appears to have a balanced performance over all the classes of sequences.

In the second set of experiments, we predicted a target block as described in Additional Embodiment 2. In the first case, we used Method 2 for the predictor interpolation if the sum of the width and height of the target block was less than 32, otherwise we used the normal prediction with a single reference array. In the second case, for the predictor interpolation, we used Method 3 if the height (width) of the target block was less than 16, Method 2 if the height (width) of the block was 16, otherwise the normal prediction, for the vertical (horizontal) angular predictions. The BD rate performance results are shown respectively in Table 5 and Table 6. As we have noticed, these hybrid methods give better performance than only using Method 2 or Method 3 interpolation methods.

TABLE 5

Over HM-16.6-JEM-2 (parallel)

|  | Y | U | V | EncT | DecT |
|---|---|---|---|---|---|
| Class A1 | −0.09% | 0.11% | −0.04% | 98% | 94% |
| Class A2 | −0.08% | −0.14% | −0.31% | 100% | 96% |
| Class B | 0.03% | −0.08% | −0.25% | 100% | 99% |
| Class C | −0.10% | 0.55% | −0.17% | 100% | 100% |
| Class D | −0.11% | 1.57% | −0.52% | 100% | 106% |
| Class E | −0.15% | −0.43% | −0.67% | 100% | 99% |
| Overall | −0.08% | 0.28% | −0.31% | 100% | 99% |

TABLE 6

Over HM-16.6-JEM-2 (parallel)

|  | Y | U | V | EncT | DecT |
|---|---|---|---|---|---|
| Class A1 | 0.07% | 0.30% | −0.24% | 98% | 100% |
| Class A2 | −0.04% | 0.18% | −0.31% | 101% | 100% |
| Class B | −0.02% | 0.09% | −0.22% | 102% | 102% |
| Class C | −0.22% | −0.20% | −0.36% | 103% | 103% |
| Class D | −0.24% | 0.75% | −1.89% | 100% | 98% |
| Class E | −0.20% | −0.04% | −0.48% | 101% | 101% |
| Overall | −0.10% | 0.19% | −0.57% | 101% | 101% |

Accordingly, the present embodiments aim to improve the prediction accuracy of a target block using additional reference arrays to form a composite reference array, thus leading to higher coding gain. Since the encoder does not have to check for the RD performance with each reference array, as done in the prior art, but rather only attempts to improve the interpolation for angular prediction modes for some target pixels, the additional complexity requirements at the encoder is mainly for constructing the additional reference arrays, which is minimal. At the decoder side, the increase in complexity is also minimal.

Various methods are described above, and each of the methods comprises one or more steps or actions for achieving the described method. Unless a specific order of steps or actions is required for proper operation of the method, the order and/or use of specific steps and/or actions may be modified or combined.

Various methods according to the present embodiments as described above may be used to modify the intra prediction, entropy coding and/or decoding modules (160, 360, 145, 330) of the VET or HEVC encoder 100 and decoder 300 as shown in FIG. 1 and FIG. 3. Moreover, the present embodiments are not limited to VET or HEVC, and may be applied to other standards, recommendations, and extensions thereof. Various embodiments described above may be used individually or in combination.

Various numeric values are used in the present application, for example, the interpolation resolution, the block size threshold for switching between different methods, filter length, and the number of reference samples used in interpolation. It should be noted that the specific values are for exemplary purposes and the present embodiments are not limited to these specific values.

Figure 13:
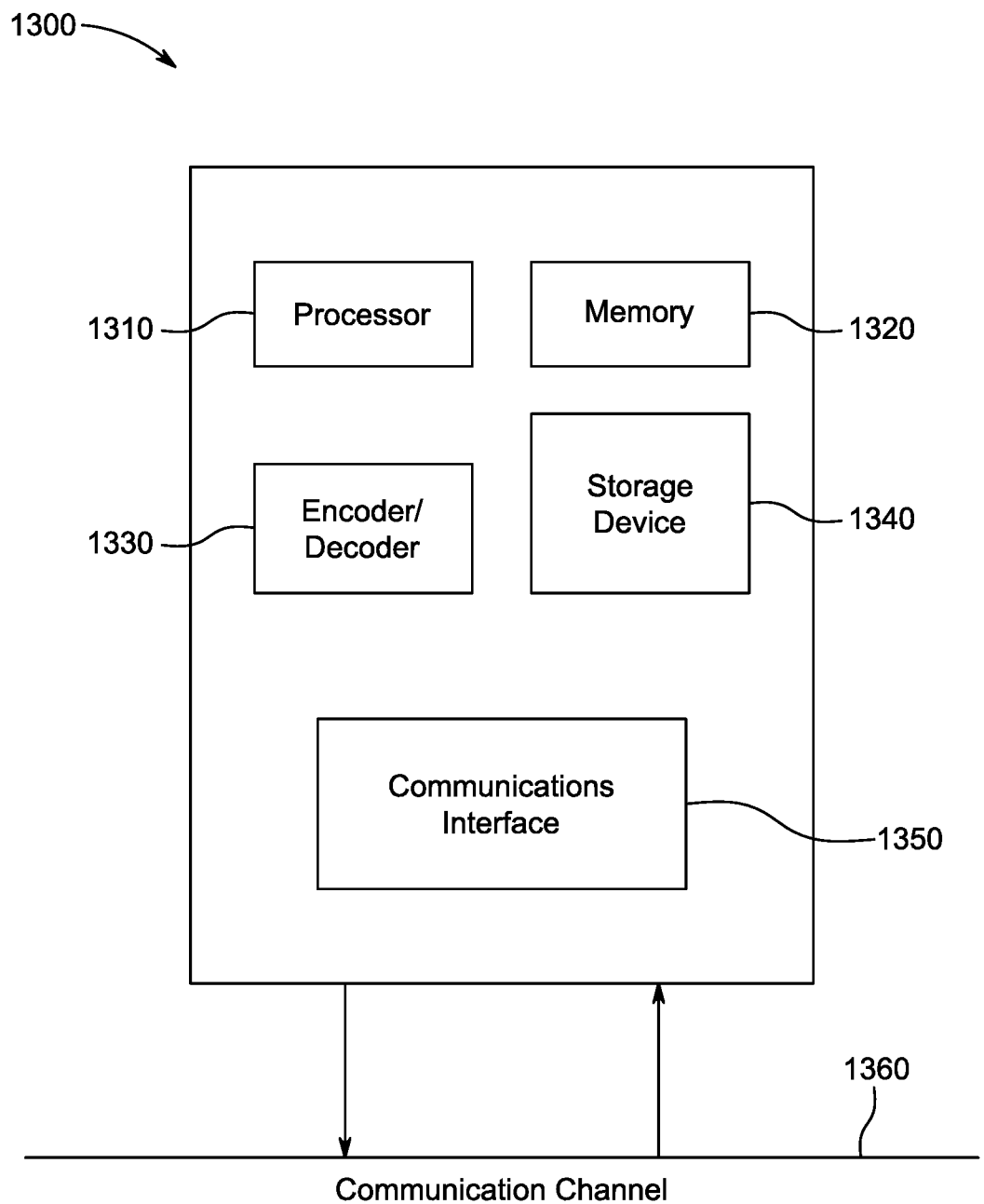
FIG. 13 illustrates a block diagram of an exemplary apparatus in which various aspects of the exemplary embodiments may be implemented.

FIG. 13 illustrates a block diagram of an exemplary system in which various aspects of the exemplary embodiments may be implemented. System 1300 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 1300 may be communicatively coupled to other similar systems, and to a display via a communication channel as shown in FIG. 13 and as known by those skilled in the art to implement the exemplary video system described above.

The system 1300 may include at least one processor 1310 configured to execute instructions loaded therein for implementing the various processes as discussed above. Processor 1310 may include embedded memory, input output interface and various other circuitries as known in the art. The system 1300 may also include at least one memory 1320 (e.g., a volatile memory device, a non-volatile memory device). System 1300 may additionally include a storage device 1320, which may include non-volatile memory, including, but not limited to, EEPROM, ROM, PROM, RAM, DRAM, SRAM, flash, magnetic disk drive, and/or optical disk drive. The storage device 1340 may comprise an internal storage device, an attached storage device and/or a network accessible storage device, as non-limiting examples. System 1300 may also include an encoder/decoder module 1330 configured to process data to provide an encoded video or decoded video.

Encoder/decoder module 1330 represents the module(s) that may be included in a device to perform the encoding and/or decoding functions. As is known, a device may include one or both of the encoding and decoding modules. Additionally, encoder/decoder module 1330 may be implemented as a separate element of system 1300 or may be incorporated within processors 1310 as a combination of hardware and software as known to those skilled in the art.

Program code to be loaded onto processors 1310 to perform the various processes described hereinabove may be stored in storage device 1340 and subsequently loaded onto memory 1320 for execution by processors 1310. In accordance with the exemplary embodiments, one or more of the processor(s) 1310, memory 1320, storage device 1340 and encoder/decoder module 1330 may store one or more of the various items during the performance of the processes discussed herein above, including, but not limited to the input video, the decoded video, the bitstream, equations, formula, matrices, variables, operations, and operational logic.

The system 1300 may also include communication interface 1350 that enables communication with other devices via communication channel 1360. The communication interface 1350 may include, but is not limited to a transceiver configured to transmit and receive data from communication channel 1360. The communication interface may include, but is not limited to, a modem or network card and the communication channel may be implemented within a wired and/or wireless medium. The various components of system 1300 may be connected or communicatively coupled together using various suitable connections, including, but not limited to internal buses, wires, and printed circuit boards.

The exemplary embodiments may be carried out by computer software implemented by the processor 1310 or by hardware, or by a combination of hardware and software. As a non-limiting example, the exemplary embodiments may be implemented by one or more integrated circuits. The memory 1320 may be of any type appropriate to the technical environment and may be implemented using any appropriate data storage technology, such as optical memory devices, magnetic memory devices, semiconductor-based memory devices, fixed memory and removable memory, as non-limiting examples. The processor 1310 may be of any type appropriate to the technical environment, and may encompass one or more of microprocessors, general purpose computers, special purpose computers and processors based on a multi-core architecture, as non-limiting examples.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for encoding video data, comprising:
accessing a block in the video data;
forming a plurality of reference arrays for the block of the video data from reconstructed samples of the video data;
forming a composite reference array from said plurality of reference arrays by projecting along a prediction direction one or more of said plurality of reference arrays onto a reference array closest to the block of the video data, wherein reference samples in said composite reference array are alternated from said plurality of reference arrays;
obtaining filter coefficients for an interpolation filter, responsive to how reference samples in said composite reference array are alternated;
obtaining a predictor for a target pixel of the block of the video data from said composite reference array, responsive to said filter coefficients for said interpolation filter, wherein said filter coefficients for the interpolation filter are determined based on a location of said predictor on said composite reference array, and wherein said filter coefficients for the interpolation filter are based on respective distances between said predictor and reference samples used for interpolating said predictor; and
encoding the block of the video data using the predictor.

2. The method of claim 1, wherein each reference array of said plurality of reference arrays is above said block or each reference array is to the left of said block.

3. The method of claim 1, wherein the interpolation filter is chosen based on a block size of the block.

4. A method for decoding video data, comprising:
forming a plurality of reference arrays for a block of the video data from decoded samples of the video data;
forming a composite reference array from said plurality of reference arrays by projecting along a prediction direction one or more of said plurality of reference arrays onto a reference array closest to the block of the video data, wherein reference samples in said composite reference array are alternated from said plurality of reference arrays;
obtaining filter coefficients for an interpolation filter, responsive to how reference samples in said composite reference array are alternated;
obtaining a predictor for a target pixel of the block of the video data from said composite reference array, responsive to said filter coefficients for said interpolation filter, wherein said filter coefficients for the interpolation filter are determined based on a location of said predictor on said composite reference array, and wherein the filter coefficients for the interpolation filter are based on respective distances between said predictor and reference samples used for interpolating said predictor; and
decoding the block of the video data using the predictor.

5. The method of claim 4, wherein each reference array of said plurality of reference arrays is above said block or each reference array is to the left of said block.

6. The method of claim 4, wherein said interpolation filter is chosen based on a block size of the block.

7. An apparatus for encoding video data, comprising one or more processors, wherein said one or more processors are configured to:
   access a block in the video data;
   form a plurality of reference arrays for the block of the video data from reconstructed samples of the video data;
   form a composite reference array from said plurality of reference arrays by projecting along a prediction direction one or more of said plurality of reference arrays onto a reference array closest to the block of the video data, wherein reference samples in said composite reference array are alternated from said plurality of reference arrays;
   obtain filter coefficients for an interpolation filter, responsive to how reference samples in said composite reference array are alternated;
   obtain a predictor for a target pixel of the block of the video data from said composite reference array, responsive to said filter coefficients for said interpolation filter, wherein said filter coefficients for the interpolation filter are determined based on a location of said predictor on said composite reference array, and wherein the filter coefficients for the interpolation filter are based on respective distances between said predictor and reference samples used for interpolating said predictor; and
   encode the block of the video data using the predictor.

8. The apparatus of claim 7, wherein each reference array of said plurality of reference arrays is above said block or each reference array is to the left of said block.

9. The apparatus of claim 7, wherein said interpolation filter is chosen based on a block size of the block.

10. An apparatus for decoding video data, comprising one or more processors, wherein said one or more processors are configured to:
    form a plurality of reference arrays for a block of the video data from decoded samples of the video data;
    form a composite reference array from said plurality of reference arrays by projecting along a prediction direction one or more of said plurality of reference arrays onto a reference array closest to the block of the video data, wherein reference samples in said composite reference array are alternated from said plurality of reference arrays;
    obtain filter coefficients for an interpolation filter, responsive to how reference samples in said composite reference array are alternated;
    obtain a predictor for a target pixel of the block of the video data from said composite reference array, responsive to said filter coefficients for said interpolation filter, wherein said filter coefficients for the interpolation filter are determined based on a location of said predictor on said composite reference array, and wherein the filter coefficients for the interpolation filter are based on respective distances between said predictor and reference samples used for interpolating said predictor; and
    decode the block of the video data using the predictor.

11. The apparatus of claim 10, wherein each reference array of said plurality of reference arrays is above said block or each reference array is to the left of said block.

12. The apparatus of claim 10, wherein the interpolation filter is chosen based on a block size of the block.

13. A non-transitory computer readable storage medium having stored thereon instructions for encoding video data according to the method of claim 1.

14. A non-transitory computer readable storage medium having stored thereon instructions for decoding video data according to the method of claim 4.

15. The method of claim 1, wherein said obtaining filter coefficients for an interpolation filter comprises:
    obtaining a distance between said predictor and the closest reference sample on the left of said predictor on said composite reference array; and
    obtaining a Gaussian filter corresponding to said distance as said interpolation filter.

16. The method of claim 1, wherein said plurality of reference arrays include said closest reference array and a second reference array, and wherein said obtaining filter coefficients for an interpolation filter comprises:
    obtaining a first Gaussian filter based on respective distances between said predictor and reference samples of said closest reference array;
    obtaining a second Gaussian filter based on respective distances between said predictor and reference samples projected from said second reference array; and
    obtaining said filter coefficients for said interpolation filter based on said first Gaussian filter and said second Gaussian filter.

17. The method of claim 4, wherein said obtaining filter coefficients for an interpolation filter comprises:
    obtaining a distance between said predictor and the closest reference sample on the left of said predictor on said composite reference array; and
    obtaining a Gaussian filter corresponding to said distance as said interpolation filter.

18. The method of claim 4, wherein said plurality of reference arrays include said closest reference array and a second reference array, and wherein said obtaining filter coefficients for an interpolation filter comprises:
    obtaining a first Gaussian filter based on respective distances between said predictor and reference samples of said closest reference array;
    obtaining a second Gaussian filter based on respective distances between said predictor and reference samples projected from said second reference array; and
    obtaining said filter coefficients for said interpolation filter based on said first Gaussian filter and said second Gaussian filter.

19. The apparatus of claim 7, wherein said one or more processors are configured to obtain filter coefficients for an interpolation filter by performing:
    obtaining a distance between said predictor and the closest reference sample on the left of said predictor on said composite reference array; and
    obtaining a Gaussian filter corresponding to said distance as said interpolation filter.

20. The apparatus of claim 7, wherein said plurality of reference arrays include said closest reference array and a second reference array, and wherein said one or more processors are configured to obtain filter coefficients for an interpolation filter by performing:
    obtaining a first Gaussian filter based on respective distances between said predictor and reference samples of said closest reference array;
    obtaining a second Gaussian filter based on respective distances between said predictor and reference samples projected from said second reference array; and obtaining said filter coefficients for said interpolation filter based on said first Gaussian filter and said second Gaussian filter.

21. The apparatus of claim 10, wherein said one or more processors are configured to obtain filter coefficients for an interpolation filter by performing:
- obtaining a distance between said predictor and the closest reference sample on the left of said predictor on said composite reference array; and
- obtaining a Gaussian filter corresponding to said distance as said interpolation filter.

22. The apparatus of claim 10, wherein said plurality of reference arrays include said closest reference array and a second reference array, and wherein said one or more processors are configured to obtain filter coefficients for an interpolation filter by performing:
- obtaining a first Gaussian filter based on respective distances between said predictor and reference samples of said closest reference array;
- obtaining a second Gaussian filter based on respective distances between said predictor and reference samples projected from said second reference array; and
- obtaining said filter coefficients for said interpolation filter based on said first Gaussian filter and said second Gaussian filter.

* * * * *